US008743319B2

United States Patent
Higashi

(10) Patent No.: US 8,743,319 B2
(45) Date of Patent: Jun. 3, 2014

(54) LIQUID CRYSTAL PANEL HAVING SEVERAL POLARIZING PLATES WITH RELATED LIGHT TRANSMITTANCE AND LIQUID CRYSTAL DISPLAY APPARATUS

(75) Inventor: Masatsugu Higashi, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 280 days.

(21) Appl. No.: 12/637,385

(22) Filed: Dec. 14, 2009

(65) Prior Publication Data

US 2010/0171907 A1 Jul. 8, 2010

(30) Foreign Application Priority Data

Jan. 7, 2009 (JP) .................. 2009-001397

(51) Int. Cl.
*G02F 1/1335* (2006.01)
(52) U.S. Cl.
USPC ............. 349/95; 349/117; 349/119; 349/120; 349/121
(58) Field of Classification Search
CPC ................................. G02F 1/133528
USPC .................... 349/96, 117, 119–121
See application file for complete search history.

(56) References Cited

U.S. PATENT DOCUMENTS

| 5,739,881 | A * | 4/1998 | Xu et al. ........................ 349/118 |
| 6,094,245 | A | 7/2000 | Ochi et al. |
| 6,208,396 | B1 * | 3/2001 | Shimizu et al. ............... 349/119 |
| 6,577,361 | B1 | 6/2003 | Sekiguchi et al. |
| 7,012,663 | B2 | 3/2006 | Ono et al. |
| RE39,082 | E * | 5/2006 | Kubo et al. .................... 349/114 |
| 7,812,901 | B2 | 10/2010 | Kinjo et al. |
| 7,864,268 | B2 | 1/2011 | Egi et al. |
| 8,031,296 | B2 | 10/2011 | Maezawa et al. |
| 2004/0239852 | A1 | 12/2004 | Ono et al. |

(Continued)

FOREIGN PATENT DOCUMENTS

| JP | 10-133196 A | 5/1998 |
| JP | 3648240 B2 | 5/2005 |

(Continued)

OTHER PUBLICATIONS

Korean Office Action dated Apr. 28, 2011, issued in corresponding Korean Patent Application No. 10-2010-0000878.

(Continued)

*Primary Examiner* — Hoan C Nguyen
(74) *Attorney, Agent, or Firm* — Westerman, Hattori, Daniels & Adrian, LLP

(57) ABSTRACT

A liquid crystal panel of the present invention includes: a liquid crystal cell; a first polarizing plate placed on one side of the liquid crystal cell; a second polarizing plate and a third polarizing plate placed on another side of the liquid crystal cell in the stated order from a side of the liquid crystal cell; a first retardation plate placed between the liquid crystal cell and the first polarizing plate; and a second retardation plate placed between the liquid crystal cell and the second polarizing plate, in which: refractive index ellipsoids of the first retardation plate and the second retardation plate exhibit a relationship of nx>ny>nz; and a transmittance ($T_2$) of the second polarizing plate is larger than a transmittance ($T_1$) of the first polarizing plate, and a transmittance ($T_3$) of the third polarizing plate is equal to or larger than the transmittance ($T_1$) of the first polarizing plate.

22 Claims, 4 Drawing Sheets

(56) References Cited

U.S. PATENT DOCUMENTS

| | | | |
|---|---|---|---|
| 2007/0091236 A1* | 4/2007 | Yano et al. | 349/117 |
| 2007/0177071 A1* | 8/2007 | Egi et al. | 349/96 |
| 2007/0200977 A1 | 8/2007 | Egi et al. | |
| 2009/0207347 A1 | 8/2009 | Shimizu et al. | |
| 2009/0279031 A1 | 11/2009 | Kitagawa et al. | |
| 2010/0110345 A1 | 5/2010 | Sakai et al. | |
| 2010/0110347 A1 | 5/2010 | Kitagawa et al. | |
| 2010/0141873 A1 | 6/2010 | Kinjo et al. | |
| 2010/0182546 A1 | 7/2010 | Maezawa et al. | |
| 2011/0063545 A1 | 3/2011 | Egi et al. | |

FOREIGN PATENT DOCUMENTS

| | | |
|---|---|---|
| JP | 2007-256936 A | 10/2007 |
| JP | 2007-298958 A | 11/2007 |
| JP | 2008-9388 A | 1/2008 |
| KR | 2008-0023751 A | 3/2008 |
| KR | 2008-0023752 A | 3/2008 |
| WO | 00/34821 A1 | 6/2000 |
| WO | 2007/116683 A1 | 10/2007 |
| WO | 2008/139862 A1 | 11/2008 |

OTHER PUBLICATIONS

Japanese Office Action dated Nov. 21, 2012, issued in corresponding Japanese Patent Application No. 2009-001397, with English translation (8 pages).

Japanese Office Action dated Sep. 25, 2013, issued in corresponding Japanese Patent Application No. 2009-001397, with English translation (5 pages).

* cited by examiner

LIQUID CRYSTAL PANEL HAVING SEVERAL POLARIZING PLATES WITH RELATED LIGHT TRANSMITTANCE AND LIQUID CRYSTAL DISPLAY APPARATUS

BACKGROUND OF THE INVENTION

1. Field of the Invention

The present invention relates to a liquid crystal panel and liquid crystal apparatus having superior contrast characteristics.

2. Description of the Related Art

A liquid crystal display apparatus (hereinafter, referred to as an LCD) displays characters and images, using the electrooptical characteristics of liquid crystal molecules. The LCD generally uses a liquid crystal panel in which polarizing plates are placed on both sides of a liquid crystal cell, and can display a black image under no voltage application in a normally black mode, for example. The LCD has a problem in that a contrast ratio in front and oblique directions is low. In order to solve this problem, a liquid crystal panel using a retardation film has been disclosed (for example, see JP 3648240).

Further, as an LCD having a high front contrast ratio, a VA-mode liquid crystal display apparatus is known for the following reason. In the VA-mode liquid crystal display apparatus, liquid crystal molecules are aligned substantially vertical with respect to a substrate surface under no voltage application, and hence, the influence of inhibiting a black display is small, which enables to further darken the black display.

The further increase in performance of the LCD is desired on the market, and as one example, there is a demand for a liquid crystal display apparatus exhibiting a higher front contrast ratio, capable of outputting characters and images clearly. However, there exists a problem that a degree of polarization of a polarizing plate is insufficient and therefore it is difficult to obtain a liquid crystal display apparatus having a higher contrast ratio.

SUMMARY OF THE INVENTION

It is an object of the present invention to provide a liquid crystal panel and a liquid crystal display apparatus having a high contrast ratio in a front direction.

The present inventors have conducted intensive studies for solving the above problems, and have found that the above objects can be attained with the liquid crystal panel described below, to thereby complete the present invention.

A liquid crystal panel according to an embodiment of the present invention includes a liquid crystal cell; a first polarizing plate placed on one side of the liquid crystal cell; a second polarizing plate and a third polarizing plate placed on another side of the liquid crystal cell in the stated order from a side of liquid crystal cell; a first retardation plate placed between the liquid crystal cell and the first polarizing plate; and a second retardation plate placed between the liquid crystal cell and the second polarizing plate, wherein: refractive index ellipsoids of the first retardation plate and the second retardation plate exhibit a relationship of nx>ny>nz; and a light transmittance ($T_2$) of the second polarizing plate is larger than a light transmittance ($T_1$) of the first polarizing plate, and a light transmittance ($T_3$) of the third polarizing plate is equal to or larger than the light transmittance ($T_1$) of the first polarizing plate.

In one embodiment of the invention, the light transmittance ($T_1$) of the first polarizing plate is 39.0 to 44.0%, and the light transmittance ($T_2$) of the second polarizing plate is 40.0 to 45.0%.

In another embodiment of the invention, the light transmittance ($T_3$) of the third polarizing plate is 40.0 to 60.0%.

In still another embodiment of the invention, a difference ($\Delta T_{2-1}=T_2-T_1$) between the light transmittance ($T_2$) of the second polarizing plate and the light transmittance ($T_1$) of the first polarizing plate is 0.1 to 5.0%.

In still another embodiment of the invention, a difference ($\Delta T_{3-1}=T_3-T_1$) between the light transmittance ($T_3$) of the third polarizing plate and the light transmittance ($T_1$) of the first polarizing plate is 0 to 19.0%.

In still another embodiment of the invention, the first polarizing plate is placed on a viewer side of the liquid crystal cell, and the second polarizing plate and the third polarizing plate are placed on a side opposite to the viewer side of the liquid crystal cell.

In still another embodiment of the invention, the second polarizing plate comprises a second polarizer, the third polarizing plate comprises a third polarizer, and the third polarizer is a transmissive polarizer.

In still another embodiment of the invention, a slow axis of the first retardation plate and an absorption axis of a polarizer of the first polarizing plate are substantially perpendicular to each other, and a slow axis of the second retardation plate and an absorption axis of the second polarizer are substantially perpendicular to each other.

In still another embodiment of the invention, the absorption axis of the second polarizer and an absorption axis of the transmissive polarizer of the third polarizing plate are substantially parallel to each other.

In still another embodiment of the invention, the liquid crystal cell comprises liquid crystal molecules aligned homeotropically.

In still another embodiment of the invention, each of thickness direction retardation (Rth[590]) at a wavelength of 590 nm of the first retardation plate and the second retardation plate is 80 to 400 nm.

In still another embodiment of the invention, each of Nz coefficient of the first retardation plate and the second retardation plate is more than 1.1 and 8 or less.

In still another embodiment of the invention, each of the first and second retardation plate is a retardation plate containing a polyimide-based resin, a polyamide-based resin, a polyester-based resin, a polyvinylacetal-based resin, a polycarbonate-based resin, an acrylic resin, a norbornene-based resin, or a cellulose-based resin.

According to another aspect of the present invention, a liquid crystal display apparatus is provided. The liquid crystal display apparatus includes the liquid crystal panel as described above.

The liquid crystal display apparatus including a liquid crystal panel of the present invention exhibits a remarkably higher contrast ratio in a front direction and more excellent display properties compared with those of a liquid crystal display apparatus including a conventional liquid crystal panel, by using three polarizing plates with a transmittance adjusted and two retardation plates placed between a liquid crystal cell and a polarizing plate.

DETAILED DESCRIPTION OF THE INVENTION

<Definition of Terms and Symbols>

The definition of the terms and symbols in the specification of the present invention are as follows.

(1) Light Transmittance of Polarizing Plate

A light transmittances (T) of a polarizing plate refers to a Y value obtained through visibility correction by a two-degree field of view (C light source) in accordance with JIS Z 8701-1982.

(2) Refractive Index (nx, ny and nz)

"nx" represents a refractive index in a direction in which an in-plane refractive index becomes maximum (i.e., in a slow axis direction), "ny" represents a refractive index in a direction perpendicular to the slow axis in the same plane (i.e., in a fast axis direction), and "nz" represents a refractive index in a thickness direction.

(3) In-plane Retardation Value

An in-plane retardation value ($Re[\lambda]$) refers to an in-plane retardation value of a film at a wavelength $\lambda$ (nm) at 23° C. $Re[\lambda]$ is obtained by $Re[\lambda]=(nx-ny) \times d$ where the thickness of the film is d (nm).

(4) Thickness Direction Retardation Value

A thickness direction retardation value ($Rth[\lambda]$) refers to a retardation value in a film thickness direction at a wavelength $\lambda$ (nm) at 23° C. $Rth[\lambda]$ is obtained by $Rth[\lambda]=(nx-nz) \times d$ where the thickness of the film is d (nm).

(5) Birefringence in Thickness Direction

A birefringence ($\Delta n_{xz}[\lambda]$) in a thickness direction is obtained by $\Delta n_{xz}[\lambda]=Rth[\lambda]/d$.

(6) Nz Coefficient

An Nz coefficient is obtained by $Nz=Rth[590]/Re[590]$.

(7) In the specification of the present invention, the phrase "nx=ny" or "ny=nz" not only refers to a case where they are completely equal but also includes a case where they are substantially equal. Therefore, for example, the phrase "nx=ny" includes a case where Re[590] is less than 10 nm.

(8) In the specification of the present invention, the phrase "substantially perpendicular" includes a case where an angle formed by two optical axes is 90°±2°, and preferably 90°±1°. The phrase "substantially parallel" includes a case where an angle formed by two optical axes is 0°±2°, and preferably 0°±1°.

<A. Outline of Liquid Crystal Panel>

Figure 1:
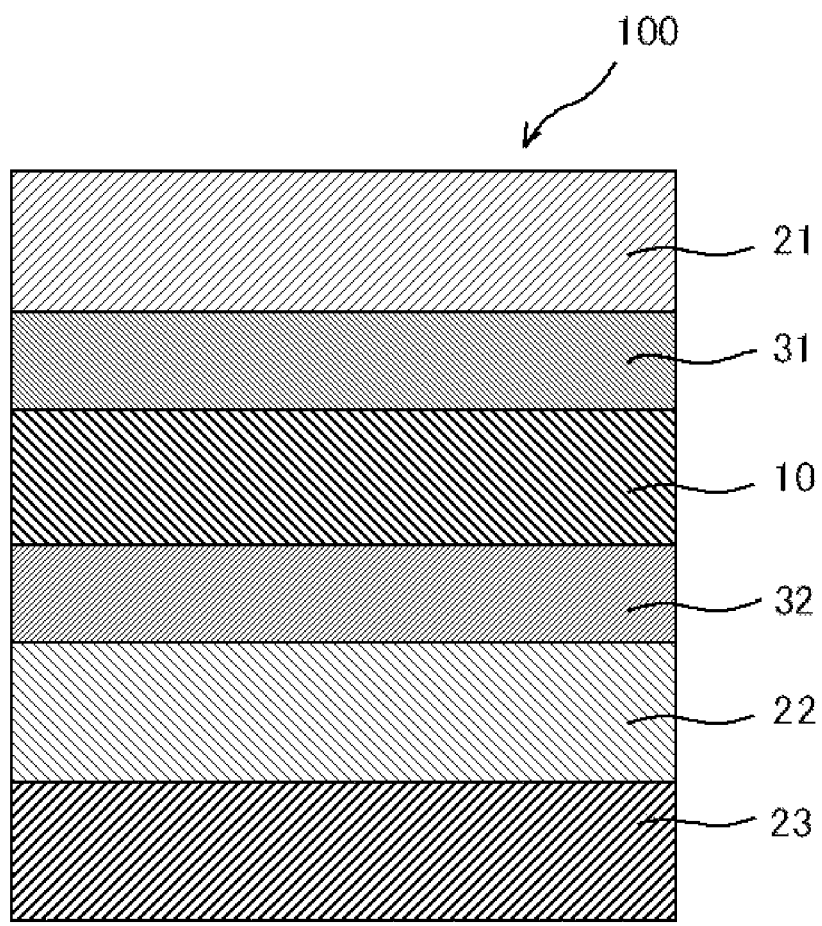
FIG. 1 is a schematic cross-sectional view of a liquid crystal panel according to a preferred embodiment of the present invention.

FIG. 1 is a schematic cross-sectional view of a liquid crystal panel according to a preferred embodiment of the present invention. A liquid crystal panel 100 includes a liquid crystal cell 10, a first polarizing plate 21 placed on one side of the liquid crystal cell 10, a second polarizing plate 22 and a third polarizing plate 23 placed on the other side of the liquid crystal cell 10 in the stated order from the liquid crystal cell 10 side, a first retardation plate 31 placed between the liquid crystal cell 10 and the first polarizing plate 21, and a second retardation plate 32 placed between the liquid crystal cell 10 and the second polarizing plate 22. Practically, any adhesion layer and/or another optical member (not shown) is placed between the liquid crystal cell 10 and the first polarizing plate 21, and between the liquid crystal cell 10 and the third polarizing plate 23.

A light transmittance ($T_2$) of the second polarizing plate is larger than a light transmittance ($T_1$) of the first polarizing plate. A difference ($\Delta T_{2-1}=T_2-T_1$) between a light transmittance ($T_2$) of the second polarizing plate and a light transmittance ($T_1$) of the first polarizing plate is more than 0%, preferably 0.1% to 5.0%, more preferably 0.1% to 3.0%, particularly preferably 0.1% to 2.0%. By using the first and second polarizing plates having a difference in light transmittance in the above range, the liquid crystal panel of the present invention can provide a liquid crystal display apparatus with a much higher contrast ratio in a front direction.

A light transmittance ($T_3$) of the third polarizing plate is equal to or larger than the light transmittance ($T_1$) of the first polarizing plate. A difference ($\Delta_{3-1}=T_3-T_1$) between a light transmittance ($T_3$) of the third polarizing plate and a light transmittance ($T_1$) of the first polarizing plate is 0% or more, preferably 0 to 19.0%, more preferably 0 to 17.0%, particularly preferably 0 to 15.0% By using the first and third polarizing plates having a difference in light transmittance in the above range, the liquid crystal panel of the present invention can provide a liquid crystal display apparatus with a much higher contrast ratio in a front direction.

There is no particular limit to the difference between the light transmittance ($T_2$) of the second polarizing plate and the light transmittance ($T_3$) of the third polarizing plate, and $\Delta T_{2-1}$ and $\Delta T_{3-1}$ only need to be in the above range. Preferably, the light transmittance ($T_3$) of the third polarizing plate is equal to or larger than the light transmittance ($T_2$) of the second polarizing plate.

Preferably, the first polarizing plate is placed on a viewer side of the liquid crystal cell, and the second polarizing plate and the third polarizing plate are placed on a side (backlight side) opposite to the viewer side of the liquid crystal cell. In such an arrangement, due to the presence of the third polarizing plate, light of a desired component in one direction is allowed to be incident upon a liquid crystal cell more than light of a component in the other direction. More specifically, due to the presence of the third polarizing plate, a polarization degree that is insufficient only with the second polarizing plate can be compensated. Further, by placing the second polarizing plate and the third polarizing plate, having a light transmittance larger than that of the first polarizing plate, on the backlight side, more polarized light is allowed to be incident upon the liquid crystal cell, and when a white image display and a color display are performed, a high brightness is obtained compared with a black brightness. On the other hand, the brightness (black brightness) can be suppressed when a black image is displayed by placing a polarizing plate with a small light transmittance on the viewer side to minimize the leakage of light from the backlight to the viewer side. As a result, a liquid crystal display apparatus with a high contrast ratio can be obtained.

Preferably, the first polarizing plate includes a first polarizer, the second polarizing plate includes a second polarizer, and the third polarizing plate includes a third polarizer. Preferably, the third polarizer is a transmissive polarizer. Preferably, the absorption axis of the first polarizer is substantially perpendicular to the absorption axis of the second polarizer.

Preferably, the absorption axis of the first polarizer and the slow axis of the first retardation plate are substantially perpendicular to each other, and the absorption axis of the second polarizer and the slow axis of the second polarizing plate are substantially perpendicular to each other. More preferably, the absorption axis of the first polarizer and the slow axis of the first retardation plate are substantially perpendicular to each other, the absorption axis of the second polarizer and the slow axis of the second retardation plate are substantially perpendicular to each other, and the absorption axis of the second polarizer and the absorption axis of the third polarizer are substantially parallel to each other. In such an arrangement, light with a higher polarization degree is allowed to be incident upon the liquid crystal cell, and hence, a liquid crystal display apparatus with a high contrast ratio can be obtained.

The liquid crystal panel is preferably in a normally black mode. In the specification of the present invention, the term "normally black mode" refers to a liquid crystal panel in which a light transmittance becomes minimum (a screen becomes dark) under no voltage application, and the light transmittance increases under voltage application. The effect of enhancing a contrast ratio in a front direction is particularly remarkable in a liquid crystal panel in a normally black mode, which performs a black display under no voltage application. It is considered that the effect obtained by using the first, the second and the third polarizing plates is not inhibited by the driving of liquid crystal molecules.

<B. Liquid Crystal Cell>

As the liquid crystal cell used in the present invention, any suitable one can be adopted. Examples of the above liquid crystal cell include an active matrix type using a thin film transistor and a passive matrix type adopted in a super-twisted nematic liquid crystal display apparatus.

The liquid crystal cell preferably includes a pair of substrates and a liquid crystal layer as a display medium placed between the pair of substrates. On one substrate (active matrix substrate), switching elements (typically, TFTs) for controlling the electrooptical characteristics of liquid crystal, and scanning lines that provide a gate signal to the switching elements and signal lines that provide a source signal to the switching elements are provided. On the other substrate (color filter substrate), a color filter is provided.

The color filter may be provided on the active matrix substrate. Alternatively, in the case where an RGB 3-color light source (which may further include a multi-color light source) is used for illumination means of a liquid crystal display apparatus as in a field sequential system, the above-mentioned color filter can be omitted. The interval between two substrates is controlled with spacers. On a side of each substrate, which is in contact with a liquid crystal layer, an alignment film made of, for example, polyimide is provided. Alternatively, for example, in the case where the initial alignment of liquid crystal molecules is controlled using a fringe electric field formed by a patterned transparent electrode, the alignment film can be omitted.

The liquid crystal cell preferably contains liquid crystal molecules arranged in a homeotropic alignment. In the specification of the present invention, the term "homeotropic alignment" refers to the state in which an alignment vector of liquid crystal molecules is aligned vertically (in a normal direction) with respect to the plane of a substrate as a result of the interaction between the substrate subjected to an alignment treatment and liquid crystal molecules. The homeotropic alignment also includes the case where the alignment vector of liquid crystal molecules is slightly inclined with respect to the direction normal to a substrate, i.e., the case where liquid crystal molecules have a pretilt. In the case where liquid crystal molecules have a pretilt, the pretilt angle (angle from the normal line of the substrate) is preferably 5° or less. By setting the pretilt angle in the above range, a liquid crystal display apparatus with a high contrast ratio can be obtained.

Examples of the driving mode using a liquid crystal cell include a vertical alignment (VA) mode, a twisted nematic (TN) mode, an in-plane switching (IPS) mode, a vertical alignment type electric field control birefringence (ECB) mode, and an optical compensation birefringence (OCB) mode. Preferably, the liquid crystal cell is in a vertical alignment (VA) mode.

The liquid crystal cell of a VA mode allows liquid crystal molecules arranged in a homeotropic alignment in the absence of an electric field to respond with an electric field in a direction normal to a substrate, using a voltage control birefringence effect. Specifically, for example, as described in JP 62-210423 A and JP 04-153621 A, in the case of a normally black mode, liquid crystal molecules are arranged in a direction normal to a substrate in the absence of an electric field, so a black display is obtained when upper and lower polarizing plates are placed such that the respective absorption axes are perpendicular to each other. On the other hand, under electric field application, liquid crystal molecules are operated so as to be tilted at an azimuth of 45° with respect to an absorption axis of a polarizing plate, whereby a light transmittance increases to obtain a white display.

The liquid crystal cell of a VA mode may be set to be a multi-domain by using an electrode with a slit or a base material with protrusions formed on its surface, as described in JP 11-258605 A, for example. Examples of such a liquid crystal cell include an ASV (Advanced Super View) mode manufactured by Sharp Corporation, a CPA (Continuous Pinwheel Alignment) mode manufactured by Sharp Corporation, a MVA (Multi-domain Vertical Alignment) mode manufactured by Fujitsu Ltd., a PVA (Patterned Vertical Alignment) mode manufactured by Samsung Electronics Co., Ltd., an EVA (Enhanced Vertical Alignment) mode manufactured by Samsung Electronics Co., Ltd., and SURVIVAL (Super Ranged Viewing by Vertical Alignment) mode manufactured by Sanyo Electric Co., Ltd.

$Rth_{LC}[590]$ under no electric field application of the liquid crystal cell is preferably −500 nm to −200 nm, and more preferably −400 nm to −200 nm. The above $Rth_{LC}[590]$ is appropriately set based on the birefringence of liquid crystal molecules and a cell gap. The cell gap (substrate interval) of the liquid crystal cell is generally 1.0 μm to 7.0 μm.

As the liquid crystal cell, the one mounted on a commercially available liquid crystal display apparatus may be used as it is. Examples of the commercially available liquid crystal display apparatuses including a liquid crystal cell of a VA mode include a liquid crystal television "AQUOS series" (trade name) manufactured by Sharp Corporation, a liquid crystal television "BRAVIA series" (trade name) manufactured by Sony Corporation, a 32V-type wide liquid crystal television "LN32R51B" (trade name) manufactured by SUMSUNG, a liquid crystal television "FORIS SC26XD1" (trade name) manufactured by NANAO Corporation, and a liquid crystal television "T460HW01" (trade name) manufactured by AU Optronics.

<C: Polarizing Plate>

As a first polarizing plate, a second polarizing plate and a third polarizing plate used in the present invention, any suitable polarizing plates can be adopted as long as a light transmittance satisfies the above relationship. A liquid crystal panel of the present invention is provided with the third polarizing plate, to thereby allow large amount of light having a desired higher degree of polarization to be incident upon a liquid crystal cell. As a result, a liquid crystal panel having a higher contrast ratio in a front direction can be obtained. In the specification of the present invention, the term "polarizing plate" refers to the one that converts natural light or polarized light into linearly polarized light. Preferably, the first polarizing plate and the second polarizing plate have a function of separating incident light into two polarized light components whose polarization directions are perpendicular to each other, and transmits one polarized light component and absorbs, reflects, and/or scatters the other polarized light component.

Preferably, the third polarizing plate contains a transmissive polarizer. In the present specification, "transmissive polarizer" refers to one having a function of separating incident light into two polarized light components whose polarization directions are perpendicular to each other, and transmits one polarized light component and absorbs the other polarized light component.

The polarizing plate may be a single layer (which may also be referred to as a polarizer) having a polarization function, or may be a laminate composed of a plurality of layers. In the case where the polarizing plate is a laminate, examples of the configuration include (a) a laminate (e.g., a configuration of an example) including a polarizer and a protective layer, (b) a laminate including a polarizer, a protective layer, and a surface treatment layer, and (c) a laminate including at least two layers of polarizers. The polarizing plate may have two or more surface treatment layers.

The thickness of the polarizing plate is not particularly limited, and includes a general concept of a thin film, a film, and a sheet. The thickness of the polarizing plate is generally 1 μm to 250 μm, and preferably 1 μm to 150 μm. By setting the thickness of the polarizing plate in the above range, a polarizing plate with excellent mechanical strength can be obtained.

The light transmittance ($T_1$) of the first polarizing plate is preferably 39.0 to 44.0%, and more preferably 40.0% to 44.0%. A darker black display can be obtained by setting $T_1$ in the above range, and hence, a liquid crystal display apparatus with a higher contrast ratio in a front direction can be obtained. When the light transmittance ($T_1$) of the first polarizing plate is smaller than 39.0%, there is a possibility that a sufficiently bright display may not be obtained in a white display. When the light transmittance ($T_1$) of the first polarizing plate is larger than 44.0%, there is a possibility that light leakage may occur in a black display.

The light transmittance ($T_2$) of the second polarizing plate is preferably 40.0 to 45.0%, more preferably 41.0% to 45.0%, and particularly preferably 41.5% to 44.0%. A liquid crystal display apparatus with a higher contrast ratio in a front direction can be obtained by setting $T_2$ in the above range. When the light transmittance ($T_2$) of the second polarizing plate is smaller than 40.0%, there is a possibility that a sufficiently bright display may not be obtained in a white display. When the light transmittance ($T_2$) of the second polarizing plate is larger than 45.0%, there is a possibility that light leakage may occur in a black display.

The light transmittance ($T_3$) of the third polarizing plate is preferably 40.0% to 60.0%, more preferably 40.0% to 56.0%, and particularly preferably 40.0% to 52.0%. A liquid crystal display apparatus with a higher contrast ratio in a front direction can be obtained by setting $T_3$ in the above range. When the light transmittance ($T_3$) of the third polarizing plate is smaller than 40.0%, there is a possibility that a sufficiently bright display may not be obtained in a white display. When the light transmittance ($T_3$) of the third polarizing plate is larger than 60.0%, there is a possibility that light leakage may occur in a black display.

The liquid crystal panel of the present invention can be produced, for example, by selecting commercially available polarizing plates having different light transmittances, and appropriately combining the polarizing plates. Preferably, the liquid crystal panel of the present invention is produced by appropriately adjusting the light transmittances of polarizing plates so that a contrast ratio in a front direction becomes high, in accordance with the driving mode, application, and the like of a liquid crystal cell.

As a method of increasing or decreasing the light transmittance of the polarizing plate, for example, in the case where a polarizer mainly containing a polyvinyl alcohol-based resin containing iodine is used, there is a method of adjusting the content of iodine in the polarizer. Specifically, when the content of iodine in the polarizer is increased, the light transmittance of the polarizing plate can be decreased. When the content of iodine in the polarizer is decreased, the light transmittance of the polarizing plate can be increased. This method is also applicable for producing a roll-shaped polarizing plate and a sheet-shaped polarizing plate. The details of the polarizer will be described later.

The degree of polarization (P) of the first polarizing plate and/or the second polarizing plate is preferably 99% or more, more preferably 99.5% or more, and much more preferably 99.8% or more. By setting the degree of polarization (P) in the above range, a liquid crystal display apparatus with much higher contrast ratio in a front direction can be obtained.

The degree of polarization (P) of the third polarizing plate is preferably 50% or more, more preferably 60% or more, and much more preferably 70% or more. By setting the degree of polarization (P) in the above range, a liquid crystal display apparatus with much higher contrast ratio in a front direction can be obtained.

The degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizing plate; and using the following equation: degree of polarization (%)=$\{(H_0-H_{90})/(H_0+H_{90})\}^{1/2} \times 100$. The parallel light transmittance ($H_0$) refers to a light transmittance of a parallel laminate polarizing plate produced by piling two identical polarizing plates such that respective absorption axes are parallel to each other. The perpendicular light transmittance ($H_{90}$) refers to a light transmittance of a perpendicular laminate polarizing plate produced by piling two identical polarizing plates such that respective absorption axes are perpendicular to each other. Those light transmittances refer to a Y value obtained through visibility correction by a two-degree field of view (C light source) in accordance with JIS Z8701-1982.

<C-1. Polarizer>

As the polarizer used in the present invention, any suitable one can be adopted. Preferably, the first polarizing plate includes a first polarizer, the second polarizing plate includes a second polarizer, the third polarizing plate includes a third polarizer, and each of the first polarizer, the second polarizer and the third polarizer contains as a main component a polyvinyl alcohol-based resin with iodine. The polarizer can generally be obtained by stretching a polymer film containing as a main component a polyvinyl alcohol-based resin with iodine. A polarizing plate including such a polarizer has excellent optical properties.

The iodine content of the first polarizer is preferably 2.0% by weight to 4.0% by weight, more preferably 2.5% by weight to 3.5% by weight, and particularly preferably 2.5% by weight to 3.3% by weight. The iodine content of the second polarizer is preferably 1.5% by weight to 3.5% by weight, more preferably 2.0% by weight to 3.0% by weight, and particularly preferably 2.4% by weight to 2.6% by weight. The iodine content of the third polarizer is preferably 0.3% by weight to 3.5% by weight, and more preferably 0.5% by weight to 3.3% by weight. By setting the iodine content of each polarizer in the above range, a polarizing plate with a light transmittance in a preferred range is obtained, whereby a liquid crystal display apparatus with high contrast ratio in a front direction can be obtained.

Preferably, each of the first polarizer, the second polarizer and the third polarizer further contains potassium. The potassium content is preferably 0.2% by weight to 1.0% by weight, more preferably 0.3% by weight to 0.9% by weight, and particularly preferably 0.3% by weight to 0.8% by weight. By setting the potassium content in the above range, a polarizing plate with a light transmittance in a preferred range and high degree of polarization can be obtained.

Preferably, each of the first polarizer and the second polarizer further contains boron. The boron content is preferably 0.5% by weight to 3.0% by weight, more preferably 1.0% by weight to 2.8% by weight, and particularly preferably 1.5% by weight to 2.6% by weight. By setting the boron content in the above range, a polarizing plate with a light transmittance in a preferred range and high degree of polarization can be obtained.

The polyvinyl alcohol-based resin may be prepared by saponifying vinyl ester-based polymer obtained by polymerizing a vinyl ester-based monomer. A degree of saponification of the polyvinyl alcohol-based resin is preferably 95.0 mol % to 99.9 mol %. The degree of saponification of the polyvinyl alcohol-based resin may be determined in accordance with JIS K6726-1994. Use of the polyvinyl alcohol-based resin, the degree of saponification of which falls within the above ranges, can provide a polarizer having excellent durability.

The polyvinyl alcohol-based resin may have any suitable average degree of polymerization in accordance with the purpose. The average degree of polymerization is preferably 1,200 to 3,600. The average degree of polymerization of the polyvinyl alcohol-based resin can be measured through a method in accordance with JIS K6726-1994.

As a method of obtaining a polymer film mainly containing the polyvinyl alcohol-based resin, any suitable forming method can be adopted. As a specific example of the forming method, there is a method described in JP 2000-315144 A [Example 1].

A polymer film containing the polyvinyl alcohol-based resin as a main component preferably contains a plasticizer and/or a surfactant. Examples of the plasticizer include polyhydric alcohols such as ethylene glycol and glycerin. An example of the surfactant includes a non-ionic surfactant. The contents of the plasticizer and surfactant are preferably more than 1 to 10 parts by weight with respect to 100 parts by weight of a polyvinyl alcohol-based resin. The polyhydric alcohol and the surfactant are used for the purpose of further enhancing the dyeability and stretchability of a polarizer.

As the polymer film mainly containing the polyvinyl alcohol-based resin, a commercially available product can be used as it is. Specific examples of the commercially available polymer film mainly containing a polyvinyl alcohol-based resin include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 2:
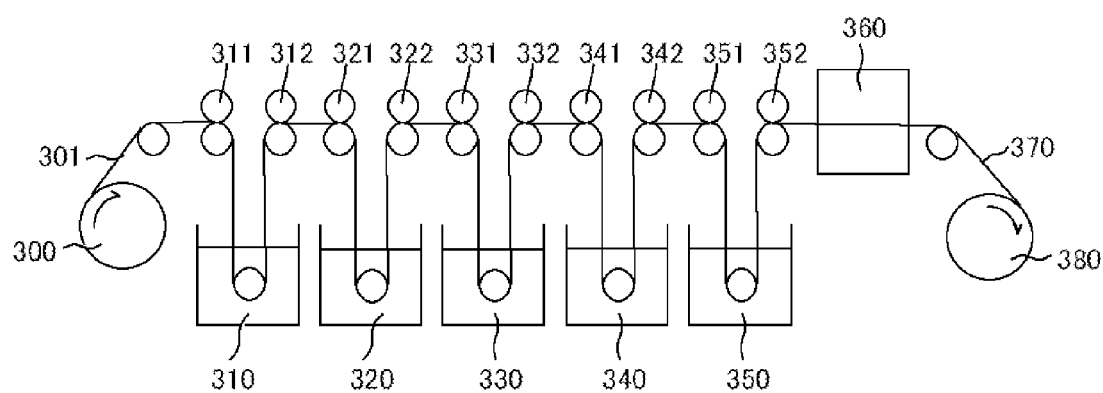
FIG. 2 is a schematic diagram illustrating a concept of a typical production process of a polarizer used in the present invention.
Figure 3A:
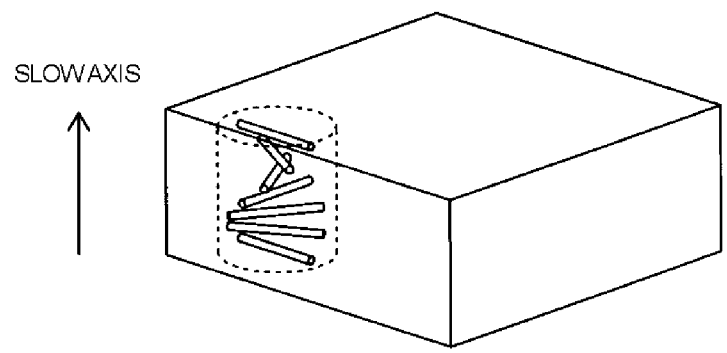
FIG. 3(a) is a schematic diagram explaining a bar-shaped liquid crystal compound in a planar alignment.
Figure 3B:
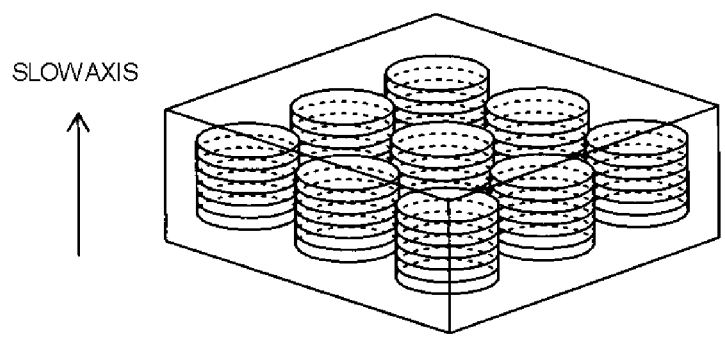
FIG. 3(b) is a schematic diagram explaining a discotic liquid crystal compound in a columnar alignment.

An example of the method of producing a polarizer will be described referring to FIG. 2. FIG. 2 is a schematic view showing a concept of a typical method of producing a polarizer used in the present invention. For example, a polymer film 301 containing a polyvinyl alcohol-based resin as a main component is fed from a feed part 300, immersed in a swelling bath 310 containing pure water and a coloring bath 320 containing an aqueous iodine solution, so as to be subjected to swelling treatment and coloring treatment under tension in a longitudinal direction of the film by rollers 311, 312, 321, and 322 at different speed ratios. Next, the film subjected to swelling treatment and coloring treatment is immersed in a first crosslinking bath 330 and a second crosslinking bath 340 containing potassium iodide, so as to be subjected to crosslinking treatment and final stretching treatment under tension in a longitudinal direction of the film by rollers 331, 332, 341, and 342 at different speed ratios. The film subjected to crosslinking treatment is immersed in a water washing bath 350 containing pure water by rollers 351 and 352, so as to be subjected to water washing treatment. The film subjected to water washing treatment is dried by drying means 360 to adjust its moisture content at, for example, 10% to 30%, and taken up in a take-up part 380. The polymer film containing a polyvinyl alcohol-based resin as a main component may be stretched to a 5 times to 7 times length of the original length through the above-mentioned processes, to thereby obtain a polarizer 370.

In the above coloring process, the adding amount of iodine in a coloring bath is preferably 0.01 parts by weight to 0.15 parts by weight, and more preferably 0.01 parts by weight to 0.05 parts by weight with respect to 100 parts by weight of water. By setting the adding amount of iodine in a coloring bath in the above range, a polarizing plate having excellent optical properties can be obtained. When the adding amount of iodine in a coloring bath is increased in the above range, a polarizing plate with low light transmittance can be obtained. Further, when the adding amount of iodine in a coloring bath is decreased in the above range, a polarizing plate with high light transmittance can be obtained.

The adding amount of potassium iodide in the above coloring bath is preferably 0.05 parts by weight to 0.5 parts by weight, and more preferably 0.1 parts by weight to 0.3 parts by weight with respect to 100 parts by weight of water. By setting the adding amount of potassium iodide in the above range, a polarizing plate with a light transmittance in a preferred range and high degree of polarization can be obtained.

In the above cross-linking process, the adding amount of potassium iodide in the first cross-linking bath and the second cross-linking bath is preferably 0.5 parts by weight to 10 parts by weight, and more preferably 1 part by weight to 7 parts by weight with respect to 100 parts by weight of water. The adding amount of boric acid in the first cross-linking bath and the second cross-linking bath is preferably 0.5 parts by weight to 10 parts by weight, and more preferably 1 part by weight to 7 parts by weight. By setting the adding amount of potassium iodide and boric acid in the above range, a polarizing plate having excellent optical properties with a light transmittance in a preferred range and high degree of polarization can be obtained.

<C-2. Protective Layer>

The first polarizing plate, the second polarizing plate and the third polarizing plate used in the present invention preferably includes a polarizer and a protective layer placed on at least one side of the polarizer. For example, the protective layer can prevent the shrinkage and expansion of the polarizer and the degradation in the polarizer due to UV-light, which can provide a polarizing plate with high durability.

In one embodiment, the first polarizing plate preferably includes a first polarizer, a first protective layer placed on a liquid crystal cell side of the first polarizer, and a second protective layer placed on an opposite side with respect to the liquid crystal cell side of the first polarizer. The second polarizing plate preferably includes a second polarizer, a third protective layer placed on a liquid crystal cell side of the second polarizer, and a fourth protective layer placed on an opposite side with respect to the liquid crystal cell side of the second polarizer. The third polarizing plate preferably includes a third polarizer, a fifth protective layer placed on a liquid crystal cell side of the third polarizer, and a sixth protective layer placed on an opposite side with respect to the liquid crystal cell side of the third polarizer. In another embodiment, the forth protective layer may also function as a fifth protective layer.

The protective layer and the polarizer can be laminated via any suitable adhesion layer. In the specification of the present invention, the term "adhesion layer" refers to a layer that connects surfaces of adjacent optical members and integrate them with a practically sufficient adhesive strength and adhesive time. Examples of a material for forming the adhesion layer include an adhesive and an anchor coat agent. The adhesion layer may have a multi-layered structure in which an anchor coat layer is formed on the surface of an adherend and an adhesive layer is formed thereon. Further, the adhesion layer may be a thin layer (which may be referred to as a hair line) which cannot be recognized with naked eyes.

In the case where the polarizer contains as a main component a polyvinyl alcohol-based resin with iodine, a material for forming the adhesion layer is preferably a water-soluble adhesive. The water-soluble adhesive is preferably a water-soluble adhesive containing a polyvinyl alcohol-based resin as a main component. As the adhesion layer, a commercially available adhesive can also be used as it is. Alternatively, a commercially available adhesive may be mixed with a solvent and an additive. An example of the commercially available adhesive containing a polyvinyl alcohol-based resin as a main component includes "GOHSEFIMER Z-200" (trade name) manufactured by Nippon Synthetic Chemical Industry Co., Ltd.

The water-soluble adhesive can further contain a cross-linking agent as an additive. Examples of the kind of the cross-linking agent include an amine compound, an aldehyde compound, a methylol compound, an epoxy compound, an isocyanate compound, and a polyvalent metal salt. As the cross-linking agent, a commercially available cross-linking agent can also be used as it is. Examples of the commercially available cross-linking agent include an aldehyde compound "Glyoxazale" (trade name) manufactured by Nippon Synthetic Chemical Industry Co., Ltd. The adding amount of the cross-linking agent can be appropriately adjusted in accordance with the purpose, and is generally more than 0 to 10 parts by weight with respect to 100 parts by weight of a solid content of a water-soluble adhesive.

[First Protective Layer]

A first protective layer is placed on a liquid crystal cell side of a first polarizer. As the thickness of the first protective layer, any suitable value can be selected appropriately in accordance with the purpose. The thickness of the first protective layer is preferably 20 µm to 100 µm. The light transmittance (T[590]) at a wavelength of 590 nm of the first protective layer is preferably 90% or more.

The first protective layer is placed between the polarizer and the liquid crystal cell, so the optical properties thereof may influence the display properties of a liquid crystal display apparatus. Thus, it is preferred that the first protective layer has a suitable retardation value. Preferably, the refractive index ellipsoid of the first protective layer exhibits a relationship of nx=ny≥nz. In the specification of the present invention, "exhibiting a relationship of nx=ny≥nz" means exhibiting a relationship of nx=ny>nz (which may also be referred to as negative uniaxiality) or a relationship of nx=ny=nz (which may also be referred to as optical isotropy).

In the case where the refractive index ellipsoid of the first protective layer exhibits a relationship of nx=ny>nz, Re[590] of the first protective layer is less than 10 nm, Rth[590] is preferably 10 nm to 80 nm, and more preferably 20 nm to 70 nm. In the case where the refractive index ellipsoid of the first protective layer exhibits a relationship of nx=ny=nz, both Re[590] and Rth[590] of the first protective layer are less than 10 nm.

As a material for forming the first protective layer, any suitable one can be adopted. Preferably, the protective layer is a polymer film containing a cellulose-based resin, a norbornene-based resin, or an acrylic resin. The polymer film containing a cellulose-based resin can be obtained, for example, by a method described in Example 1 of JP 07-112446 A. The polymer film containing a norbornene-based resin can be obtained, for example, by a method described in JP 2001-350017 A. The polymer film containing an acrylic resin can be obtained, for example, by a method described in Example 1 of JP 2004-198952 A.

[Second Protective Layer]

A second protective layer is placed on an opposite side with respect to a liquid crystal cell side of the first polarizer. As the second protective layer, any suitable one can be adopted. The thickness of the second protective layer is preferably 20 µm to 100 µm. The light transmittance (T[590]) at a wavelength of 590 nm of the second protective layer is preferably 90% or more.

As a material for forming the second protective layer, any suitable one can be adopted. Preferably, the protective layer is a polymer film containing a cellulose-based resin, a norbornene-based resin, or an acrylic resin.

The surface of the second protective layer may be subjected to any suitable surface treatment as long as the above relationship of a light transmittance can be satisfied. For example, as the protective layer, a commercially available polymer film subjected to a surface treatment can be used as it is. Alternatively, a commercially available polymer film can also be subjected to any surface treatment. Examples of the surface treatment include a diffusion treatment (anti-glare treatment), a reflection preventive treatment (antireflection treatment), a hard coat treatment, and an antistatic treatment. Examples of the commercially available diffusion treatment (anti-glare treatment) products include AG150, AGS1, AGS2, and AGT1 manufactured by Nitto Denko Corporation. Examples of the commercially available reflection preventive treatment (antireflection treatment) products include ARS and ARC manufactured by Nitto Denko Corporation. An example of the commercially available film subjected to a hard coat treatment and an antistatic treatment includes "KC8UX-HA" (trade name) manufactured by Konica Minolta Opto, Inc.

[Surface Treatment Layer]

If required, a surface treatment layer may be provided on an opposite side with respect to the side of the second protective layer on which the first polarizer is provided. As the surface treatment layer, any suitable one can be adopted in accordance with the purpose. Examples of the surface treatment layer include a diffusion treatment (anti-glare treatment) layer, a reflection preventive treatment (anti-reflection treatment) layer, a hard coat treatment layer, and an antistatic treatment layer. These surface treatment layers are used for the purpose of preventing a screen from being contaminated or damaged, and preventing a display image from becoming difficult to see due to the incidence of light of a fluorescent lamp in a room or sunlight. As the surface treatment layer, a base film with a treatment agent for forming the treatment layer bonded to the surface thereof is generally used. The base film may also function as the second protective layer. Further, the surface treatment layer may have, for example, a multi-layered structure in which a hard coat treatment layer is laminated on an antistatic treatment layer. An example of the commercially available surface treatment layer subjected to a reflection preventive treatment includes ReaLook series manufactured by Nippon Oil and Fats Co., Ltd.

[Third Protective Layer]

A third protective layer is placed on a liquid crystal cell side of the second polarizer. As the third protective layer, any suitable one can be adopted appropriately from the material, properties, conditions, and the like described with respect to the first protective layer. The first protective layer and the third protective layer may be the same as or different from each other.

[Fourth Protective Layer]

A fourth protective layer is placed on an opposite side with respect to a liquid crystal cell side of the second polarizer. As the fourth protective layer, any suitable one can be adopted appropriately from the material, properties, conditions, and the like described with respect to the second protective layer. The second protective layer and the fourth protective layer may be the same as or different from each other. The forth protective layer may also function as the fifth protective layer. That is, the second polarizing plate and the third polarizing plate may be placed on each side of the forth protective layer.

[Fifth Protective Layer]

A fifth protective layer is placed on a liquid crystal cell side of the third polarizer. As the fifth protective layer, any suitable one can be adopted appropriately from the material, properties, conditions, and the like described with respect to the first protective layer. The first protective layer and the fifth protective layer may be the same as or different from each other.

[Sixth Protective Layer]

A sixth protective layer is placed on an opposite side with respect to a liquid crystal cell side of the third polarizer. As the sixth protective layer, any suitable one can be adopted appropriately from the material, properties, conditions, and the like described with respect to the second protective layer. The second protective layer and the sixth protective layer may be the same as or different from each other.

<D. Retardation Plate>

The first retardation plate used in the present invention is placed between the liquid crystal cell and the first polarizing plate, and the second retardation plate is placed between the liquid crystal cell and the second polarizing plate. In the specification of the present invention, the "retardation plate" refers to a transparent layer having a retardation in an in-plane and/or thickness direction. The first retardation plate and the second retardation plate may be the same as or different from each other. Preferably, the first retardation plate and the second retardation plate are the same. A production efficiency is enhanced by using the same retardation plates as the first and second retardation plates.

The thickness of the retardation plate is preferably 0.5 µm to 200 µm. The light transmittance (T [590]) at a wavelength of 590 nm of the retardation plate is preferably 90% or more.

The refractive index ellipsoid of the retardation plate exhibits a relationship of nx>ny>nz for the following reason. Such a retardation plate is placed between the liquid crystal cell and the first polarizing plate and between the liquid crystal cell and the second polarizing plate, and polarizing plates having a particular relationship with the light transmittance of the first polarizing plate are used as the second and third polarizing plates, so a liquid crystal display apparatus with a high contrast in a front direction may be obtained more easily.

Re[590] of the retardation plate is 10 nm or more, preferably 20 nm to 80 nm, more preferably 30 nm to 70 nm, and particularly preferably 40 nm to 70 nm. By setting Re[590] in the above range, a liquid crystal display apparatus having a high contrast ratio in front and oblique directions and exhibiting excellent display properties can be obtained.

Rth[590] of the retardation plate can be set appropriately in accordance with the retardation value in a thickness direction of the liquid crystal cell. Rth[590] is preferably 80 nm to 400 nm, more preferably 110 nm to 350 nm, and particularly preferably 110 nm to 300 nm. By setting Rth[590] in the above range, a liquid crystal display apparatus having a high contrast ratio in an oblique direction and exhibiting excellent display properties can be obtained.

Because the refractive index ellipsoid of the retardation plate exhibits a relationship of nx>ny>nz, Rth[590] is larger than Re[590]. That is, an Nz coefficient of the retardation plate is more than 1. The Nz coefficient of the retardation plate is preferably more than 1.1 and 8 or less, more preferably 2 to 7, and particularly preferably 2 to 6. By setting the NZ coefficient in the above range, a liquid crystal display apparatus having a high contrast ratio in a front direction and an oblique direction, and exhibiting excellent display properties can be obtained.

As a material for forming the retardation plate, any suitable one can be adopted as long as the refractive index ellipsoid of the retardation plate exhibits a relationship of nx>ny>nz. The retardation plate is preferably a retardation film containing a polyimide-based resin, a polyamide-based resin, a polyester-based resin, a polyvinyl acetal-based resin, a polycarbonate-based resin, an acrylic resin, a norbornene-based resin or a cellulose-based resin.

[Polyimide-based Resin]

In the case where the polyimide-based resin is formed into a sheet by solvent casting, molecules are likely to be aligned spontaneously during an evaporation step of a solvent. Therefore, a significantly thin retardation film whose refractive index ellipsoid exhibits a relationship of nx=ny>nz can be produced. The thickness of the retardation film containing the polyimide-based resin is preferably 0.5 µm to 10 µm, and more preferably 1 µm to 5 µm. The birefringence ($\Delta n_{xz}[590]$) in a thickness direction of a retardation film containing the polyimide-based resin is preferably 0.01 to 0.12, and more preferably 0.02 to 0.08. Such a polyimide-based resin can be obtained by a method described in U.S. Pat. No. 5,344,916.

Further, the refractive index ellipsoid of the polyimide-based resin exhibits a relationship of nx=ny>nz as described above. Therefore, the polyimide-based resin does not need a complex stretching method and enables a retardation film whose refractive index ellipsoid exhibits a relationship of nx>ny>nz to be obtained by general longitudinal uniaxial stretching or transverse uniaxial stretching. Thus, even in the case where a retardation film with a large width is produced for a large liquid crystal display apparatus, a slow axis is likely to be uniform in a width direction, and an axis shift is small even when the retardation film is attached to a polarizer. Consequently, a liquid crystal display apparatus with high contrast ratio in a front direction can be obtained.

Preferably, the polyimide-based resin has a hexafluoroisopropylidene group and/or a trifluoromethyl group. More preferably, the polyimide-based resin includes a repeating unit represented by the following general formula (I) or a repeating unit represented by the following general formula (II). The polyimide-based resin including these repeating units has excellent transparency, solubility with respect to a general-purpose solvent, and large birefringence in thickness direction.

[Chemical Formula 1]

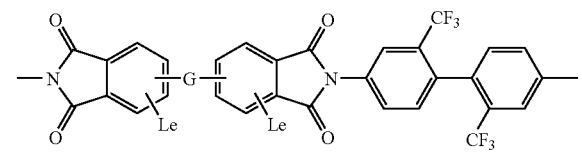

(I)

[Chemical Formula 2]

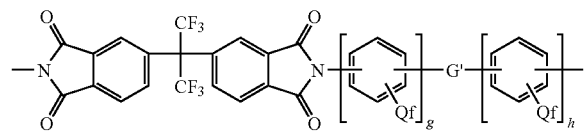

(II)

In the above general formulae (I) and (II), G and G' represent groups independently selected from a covalent bond, a $CH_2$ group, a $C(CH_3)_2$ group, a $C(CF_3)_2$ group, a $C(CX_3)_2$ group (herein, X is halogen), a CO group, an O atom, an S atom, a $SO_2$ group, a Si $(CH_2CH_3)_2$ group, and a $N(CH_3)$ group, and they may be the same or different.

In the above general formula (I), L represents a substituent, and e represents a substitution number thereof. L is, for example, halogen, an alkyl group containing 1 to 3 carbon atoms, a halogenated alkyl group containing 1 to 3 carbon atoms, a phenyl group, or a substituted phenyl group. In the case where L represents plural substituents, they may be the same or different. e represents an integer of 0 to 3.

In the above general formula (II), Q represents a substituent, and f represents a substitution number thereof. Q is, for example, an atom or a group selected from hydrogen, halogen, an alkyl group, a substituted alkyl group, a nitro group, a cyano group, a thioalkyl group, an alkoxy group, an aryl group, a substituted aryl group, an alkylester group, and a substituted alkylester group. In the case where Q represents plural substituents, they may be the same or different. f is an integer from 0 to 4, and each of g and h is an integer of 1 to 3.

The polyimide-based resin can be obtained, for example, by the reaction between tetracarboxylic dianhydride and diamine. The repeating unit in the general formula (I) can be obtained, for example, by using 2,2'-bis(trifluoromethyl)-4,4'-diaminobiphenyl as diamine, and reacting it with tetracarboxylic dianhydride having at least two aromatic rings. The repeating unit in the general formula (II) can be obtained, for example, by using 2,2-bis(3,4-dicarboxyphenyl)hexafluoropropanoic dianhydride as tetracarboxylic dianhydride, and reacting it with diamine having at least two aromatic rings. The reaction may be, for example, chemical imidization that proceeds in two stages or thermal imidization that proceeds in one stage.

As the tetracarboxylic dianhydride, any suitable one can be employed. Examples of the tetracarboxylic dianhydride include: 2,2'-bis(3,4-dicarboxyphenyl)-hexafluoropropanoic dianhydride; 3,3',4,4'-benzophenonetetracarboxylic dianhydride; 2,3,3',4-benzophenonetetracarboxylic dianhydride; 2,2',3,3'-benzophenonetetracarboxylic dianhydride; 2,2'-dibromo-4,4',5,5'-biphenyltetracarboxylic dianhydride; 2,2'-bis(trifluoromethyl)-4,4',5,5'-biphenyltetracarboxylic dianhydride; 3,3',4,4'-biphenyltetracarboxylic dianhydride; 4,4'-bis(3,4-dicarboxyphenyl)ether dianhydride; 4,4'-oxydiphthalic dianhydride; 4,4'-bis(3,4-dicarboxyphenyl) sulfonic dianhydride; bis(2,3-dicarboxyphenyl)methane dianhydride; and bis(3,4-dicarboxyphenyl)diethylsilane dianhydride.

As the diamine, any suitable one can be employed. Examples of the diamine include: 2,2'-bis(trifluoromethyl)-4,4'-diaminobiphenyl; 4,4'-diaminobiphenyl; 4,4'-diaminophenyl methane; 4,4'-(9-fluorenylidene)-dianiline; 3,3'-dichloro-4,4'-diaminodiphenyl methane; 2,2'-dichloro-4,4'-diaminobiphenyl; 4,4'-diaminodiphenyl ether; 3,4'-diaminodiphenyl ether; 4,4'-diaminodiphenyl sulfone; and 4,4'-diaminodiphenyl thioether.

As the weight average molecular weight (Mw) of the polyimide-based resin, the weight average molecular weight (Mw) using polyethylene oxide standard including as a developing solvent a dimethylformamide solution (1 L of a dimethylformamide solution prepared by: adding 10 mM lithium bromide and 10 mM phosphoric acid; and making up to 1 L) is preferably 20,000 to 180,000. Further, the imidation rate of the polyimide-based resin is preferably 95% or more. The imidation rate can be determined with a nuclear magnetic resonance (NMR) spectrum by using an integrated intensity ratio of a peak of proton derived from polyamic acid, which is a precursor of polyimide, and a peak of proton derived from polyimide.

The retardation film containing the polyimide-based resin can be obtained by any suitable forming method. Preferably, the retardation film containing the polyimide-based resin is produced by stretching a polymer film which has been formed into a sheet by solvent casting, by using a longitudinal uniaxial stretching method or a transverse uniaxial stretching method. The temperature (stretching temperature) at which the polymer film is stretched is preferably 120° C. to 200° C. Further, the magnification (stretching ratio) at which the polymer film is stretched is preferably more than 1 to 3 times or less.

[Polyamide-based Resin]

As the polyamide-based resin, any suitable polyamide-based resin can be adopted. Specifically, examples of the polyamide-based resin include a nylon-based resin such as Nylon 6 or Nylon 66; a wholly aromatic polyamide such as aramid; and a modified substance and a copolymer thereof.

[Polyester-based Resin]

Examples of the polyester-based resin include polyethylene terephthalate (PET) and polybutylene terephthalate (PBT).

[Polyvinyl Acetal-based Resin]

The polyvinyl acetal-based resin can be obtained by conducting a condensation reaction (also referred to acetalization) between a polyvinyl alcohol-based resin, and two or more aldehydes, two or more ketones or at least one aldehyde and at least one ketone.

Preferably, the polyvinyl acetal-based resin includes a repeating unit represented by the following general formula (III):

[Chemical Formula 3]

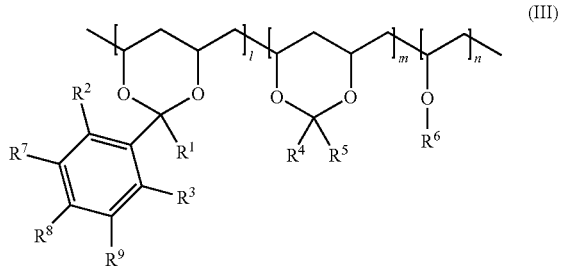

(III)

In the formula (III), $R^1$, $R^4$, and $R^5$ independently represent a hydrogen atom, a straight-chain or branched-chain alkyl group containing 1 to 8 carbon atoms, a cycloalkyl group containing 5 to 10 carbon atoms, a phenyl group, a naphthyl group, a hetero-ring group, an anthranyl group, or a phenanthrenyl group. The cycloalkyl group, the phenyl group, the naphthyl group, the hetero-ring group, the anthranyl group, and the phenanthrenyl group may respectively have a substituent. $R^2$, $R^3$, $R^7$, $R^8$, and $R^9$ independently represent a hydrogen atom, a straight-chain or branched-chain alkyl group containing 1 to 4 carbon atoms, a straight-chain or branched-chain alkoxyl group containing 1 to 4 carbon atoms, an alkoxycarbonyl group, an acyloxy group, a halogen atom, a halogenated alkyl group, a nitro group, an amino group, an azido group, a hydroxyl group, a cyano group, or a thiol group, provided that $R^2$ and $R^3$ are not hydrogen atoms simultaneously. $R^6$ represents a hydrogen atom, a straight-chain, branched-chain or cyclic alkyl group containing 1 to 8 carbon atoms, a benzyl group, a silyl group, a phosphate group, an acyl group, a benzoyl group, or a sulfonyl group. Two groups adjacent to each other, selected from $R^2$, $R^3$, $R^7$, $R^8$, and $R^9$ may form a benzene ring and as a result, a naphthyl ring may be formed. The naphthyl ring may have, as a substituent, a halogen atom, a straight-chain or branched-chain alkyl group containing 1 to 4 carbon atoms, a straight-chain or branched-chain halogenated alkyl group containing 1 to 4 carbon atoms, a straight-chain or branched-chain alkoxy group containing 1 to 4 carbon atoms, an alkoxycarbonyl group, an acyloxy group, an amino group, an azido group, a nitro group, a cyano group, or a hydroxyl group. l, m, and n represent an integer of 2 or more.

The acetalization includes a reaction between a polyvinyl alcohol-based resin, and an aldehyde or a ketone in the presence of a strong inorganic acid catalyst or a strong organic acid catalyst. Specific examples of an acid catalyst include hydrochloric acid, sulfuric acid, phosphoric acid, and p-toluenesulfonic acid. A reaction temperature in acetalization is typically higher than 0° C. and a boiling point of a solvent to be used or lower, preferably 10° C. to 100° C., and more preferably 20° C. to 80° C. A reaction temperature within the above ranges can provide a polyvinyl acetal-based resin at high yield. Specific examples of the solvent to be used in acetalization include: alcohols such as methanol, ethanol, propanol, and butanol; cyclic ethers such as 4-dioxane; and aprotic polar solvents such as N,N-dimethyl formamide, N-methylpyrrolidone, and dimethylsulfoxide. The solvent may be used alone or in combination. Further, water and the above-mentioned solvent may be mixed for use.

In the general formula (III), the substituents $R^2$, $R^3$, $R^7$, $R^8$ and $R^9$ are typically used for controlling conformation of a benzene ring and a naphthyl ring to which the substituents are bonded. To be specific, in stretching a polymer film containing the above-described polyvinyl acetal-based resin, the substituents may be easily conformed between two oxygen atoms in the general formula (III) owing to steric hindrance. As a result, a planar structure of the benzene ring and the naphthyl ring may be aligned substantially perpendicular to a virtual line connecting the two oxygen atoms.

The substituents $R^1$, $R^2$, $R^3$, $R^7$, $R^8$ and $R^9$ in the general formula (III) may each be selected appropriately in accordance with the kind of aldehyde (typically, benzaldehydes or 1-naphthaldehydes) or ketone (typically, acetophenones, benzophenones or 1-naphthones) to react with the polyvinyl alcohol-based resin for obtaining the polyacetal-based resin. For example, an aldehyde may be used for incorporating a hydrogen atom into $R^1$, and a ketone may be used for incorporating a substituent other than the hydrogen atom into $R^1$.

Specific examples of benzaldehydes include: 2-methylbenzaldehyde; 2-chlorobenzaldehyde; 2-nitrobenzaldehyde; 2-ethoxybenzaldehyde; 2-(trifluoromethyl)benzaldehyde; 2,4-dichlorobenzaldehyde; 2,4-dihydroxybenzaldehyde; sodium 2,4-disulfobenzaldehyde; disodium o-sulfobenzaldehyde; p-dimethylaminobenzaldehyde; 2,6-dimethylbenzaldhyde; 2,6-dichlorobenzaldehyde; 2,6-dimethoxybenzaldehyde; 2,4,6-trimethylbenzaldehyde (mesitaldehyde); 2,4,6-triethylbenzaldehyde; and 2,4,6-trichlorobenzaldehyde. Specific examples of 1-naphthaldehydes include: 2-methoxy-1-naphthaldehyde, 2-ethoxy-1-naphthaldehyde, 2-propoxy-1-naphthaldehyde, 2-methyl-1-naphthaldehyde and 2-hydroxy-1-naphthaldehyde. Specific examples of acetophenones include: 2-methylacetophenone; 2-aminoacetophenone; 2-chloroacetophenone; 2-nitroacetophenone; 2-hydroxyacetophenone; 2,4-dimethylacetophenone; 4'-phenoxy-2,2-dichloroacetophenone; and 2-bromo-4'-chloroacetophenone. Examples of benzophenones include: 2-methylbenzophenone; 2-aminobenzophenone; 2-hydroxybenzophenone; 4-nitrobenzophenone; 2,4'-dichlorobenzophenone; 2,4'-dihydroxybenzophenone; 4,4'-dichlorobenzophenone; 4,4'-dihydroxybenzophenone; 2-hydroxy-4-methoxybenzophenone; and 2-chloro-4'-dichlorobenzophenone. Specific examples of 1-naphthones include: 2-hydroxy-1-acetonaphthone and 8'-hydroxy-1'-benzonaphthone. Further examples of aldehyde and ketone include: 2-naphthaldehyde having a substituent; 9-anthraldehyde; 9-anthraldehyde having a substituent; acetonaphthone; fluorene-9-aldehyde; and 2,4,7-trinitrofluoren-9-one. The aldehyde or the ketone may be used alone or in combination. The aldehyde or the ketone may be subjected to appropriate modification for use.

$R^1$ in the general formula (III) represents preferably a hydrogen atom or a methyl group, and more preferably a hydrogen atom.

In the case where a moiety having $R^2$ in the general formula (III) does not have a naphthyl ring, $R^2$ and $R^3$ in the general formula (III) each independently represent preferably a methyl group, an ethyl group, a halogen atom, or a halogenated alkyl group, and more preferably a methyl group. In the case where a moiety having $R^1$ in the general formula (III) does not have a naphthyl ring, $R^7$ and $R^9$ are preferably a hydrogen atom, $R^8$ is preferably a hydrogen atom, a methyl group, an ethyl group, a halogen atom, or a halogenated alkyl group, and more preferably a methyl group. That is, the polyvinyl acetal-based resin especially preferably includes a repeating unit represented by the following general formula (IV).

[Chemical Formula 4]

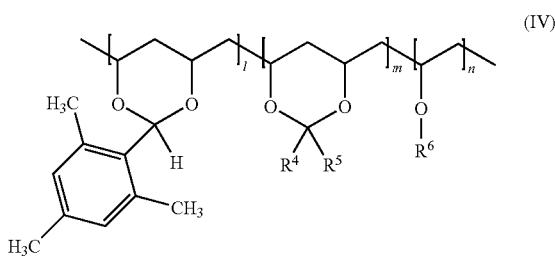

(IV)

In the case where a moiety having $R^1$ in the general formula (III) has a naphthyl ring, the naphthyl ring preferably has no substituent other than $R^2$. $R^2$ is preferably a straight or branched alkyl group having 1 to 4 carbon atoms, a straight or branched alkoxy group having 1 to 4 carbon atoms, an alkoxy carbonyl group, an acyloxy group, a halogen atom, a nitro group, an amino group, an azido group, a hydroxyl group or a cyano group, and more preferably an alkoxy group having one carbon atom (a methoxy group). Preferably, $R^3$ and $R^9$ form a benzene ring and as a result, the naphthyl ring is formed. That is, the polyvinyl acetal-based resin preferably includes a repeating unit represented by the following general formula (V).

[Chemical Formula 5]

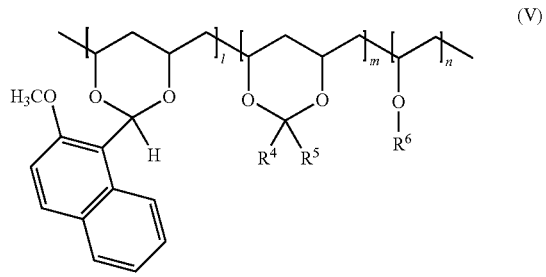

(V)

The polyvinyl alcohol-based resin to be used as a raw material of the polyvinyl acetal-based resin may be obtained by, for example: saponifying a vinyl ester-based polymer obtained through polymerization of a vinyl ester-based monomer; and converting vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

An appropriate average degree of polymerization may be employed as an average degree of polymerization of the polyvinyl alcohol-based resin. The average degree of polymerization of the polyvinyl alcohol-based resin is preferably 800 to 3,600, more preferably 1,000 to 3,200, and most preferably 1,500 to 3,000. The average degree of polymerization of the polyvinyl alcohol-based resin can be determined through a method in accordance with JIS K6726 (: 1994).

A degree of acetalization of the polyvinyl acetal-based resin is preferably 40 mol % to 99 mol %, more preferably 50 mol % to 95 mol %, and most preferably 60 mol % to 90 mol %. A degree of acetalization within the above ranges can provide a polymer film having excellent transparency by an melt extrusion method. The degree of acetalization refers to a ratio of vinyl alcohol units actually acetalized to vinyl alcohol units which may be converted into acetal units through acetal-ization. The degree of acetalization of the polyvinyl alcohol-based resin can be determined from a nuclear magnetic resonance spectrum ($^1$H-NMR).

In the general formula (III), substituents $R^4$ and $R^5$ are typically used for finely controlling the wavelength dispersion property of the retardation plate. To be specific, the substituents $R^4$ and $R^5$ are introduced, to thereby align the substituents substantially parallel to a stretching direction of the polymer film when the polymer film containing the polyvinyl acetal-based resin including a structure represented by the above general formula (III) is stretched. Further, the formability, stretchability, stability of retardation values, and orientation property by being stretched of the polymer film may be further improved.

$R^4$ and $R^5$ may each be selected appropriately in accordance with the kind of aldehyde (typically, acetoaldehyde or benzaldehydes) or ketone (typically, acetophenones or benzophenones) to react with the polyvinyl alcohol-based resin, for example. Specific examples of aldehyde and ketone are the same as those described above.

$R^5$ is preferably a hydrogen atom or a methyl group, and more preferably a hydrogen atom. In the case where a moiety having $R^1$ in the general formula (III) does not have a naphthyl ring, $R^4$ is preferably a methyl group or an ethyl group, and more preferably an ethyl group. In the case where a moiety having $R^1$ in the general formula (III) has a naphthyl ring, $R^4$ is preferably a hydrogen atom. Such substituents are introduced, to thereby provide a polymer film having extremely excellent formability, stretchability, stability of retardation values, and orientation property by being stretched.

In the general formula (III), the substituent $R^6$ is used for protection (end cap treatment) of remaining hydroxyl groups, to thereby adjust a water absorption to an appropriate value and enhance flowability of the molten resin, formability, and stability of retardation values. Thus, the position of $R^6$ may not be subjected to the end cap treatment depending on the desired water absorption or optical properties of the obtained polymer film, and the use of the polymer film (that is, $R^6$ may be a hydrogen atom).

$R^6$ may be obtained as follows: obtaining a polyvinyl acetal-based resin having hydroxyl groups remained and then subjecting the polyvinyl acetal-based resin to the end cap treatment using any appropriate group (typically, a protective group) which may react with a hydroxyl group to form a substituent. Specific examples of the protective group include: a benzyl group; a 4-methoxyphenylmethyl group; a methoxymethyl group; a trimethylsilyl group; a triethylsilyl group; a t-butyldimethylsilyl group; an acetyl group; a benzoyl group; a methanesulfonyl group; and bis-4-nitrophenylphosphite. Any appropriate reaction conditions may be employed for the end cap treatment in accordance with the kind of substituent to react with a hydroxyl group. For example, reactions such as alkylation, benzylation, silylation, phosphorylation, and sulfonylations each involve stirring a polyvinyl acetal-based resin having hydroxyl groups remained and a chloride of a target substituent in the presence of a catalyst such as 4-(N,N-dimethylamino)pyridine at 25° C. to 100° C. for 1 hour to 20 hours. $R^6$ is preferably a silyl group selected from a trimethylsilyl group, a triethylsilyl group and a t-butylmethylsilyl group. Such a substituent is used, to thereby provide a retardation plate having high transparency and excellent stability of retardation values even in an environment of high temperature and high humidity or the like.

In the general formula (III), a ratio among l, m, and n may be selected appropriately in accordance with the kinds of substituents and the purpose. l is preferably 5 to 30 mol %, more preferably 10 to 28 mol %, and particularly preferably 15 to 25 mol %, with respect to the total of l, m, and n as 100 mol %. m is preferably 20 to 80 mol %, more preferably 30 to 75 mol %, and particularly preferably 40 to 70 mol %. n is preferably 1 to 70 mol %, more preferably 1 to 50 mol %, and particularly preferably 10 to 40 mol %. A ratio among l, m, and n within the above ranges can provide a polymer film exhibiting reverse wavelength dispersion property and having extremely excellent formability, stretchability, stability or retardation values, and orientation property by being stretched.

The glass transition temperature (Tg) of the polyvinyl acetal-based resin is preferably 90° C. to 185° C., more preferably 90° C. to 150° C., and most preferably 100° C. to 140° C. The glass transition temperature (Tg) can be obtained by a DSC method in accordance with JIS K 7121 (:1987).

[Polycarbonate-based Resin]

As the above polycarbonate-based resin, an aromatic polycarbonate is preferably used. The aromatic polycarbonate can be typically obtained by the reaction between a carbonate precursor and an aromatic dihydric phenol compound. Specific examples of the carbonate precursor include phosgene, bischloroformate of dihydric phenols, diphenyl carbonate, di-p-tolylcarbonate, phenyl-p-tolylcarbonate, di-p-chlrophenylcarbonate, and dinaphthylcarbonate. Of those, phosgene and diphenylcarbonate are preferred. Specific examples of the aromatic dihydric phenol compound include: 2,2-bis(4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. They may be used alone or in combination. Preferred are: 2,2-bis(4-hydroxyphenyl)propane; 1,1-bis(4-hydroxyphenyl)cyclohexane; and 1,1-bis(4-hydroxyphenyl)-3,3,5-trimethylcyclohexane. In particular, 2,2-bis(4-hydroxyphenyl)propane and 1,1-bis(4-hydroxyphenyl)-3,3,5-trimethylcyclohexane are preferably used in combination.

[Acrylic Resin]

The acrylic rein can be obtained, for example, by subjecting acrylate-based monomers to addition polymerization. Examples of the acrylic resin include polymethyl methacrylate (PMMA), polybutyl methacrylate, and polycyclohexyl methacrylate.

[Norbornene-based Resin]

The norbornene-based resin has a small absolute value (C[590]) of a photoelastic coefficient, so a liquid crystal display apparatus with small optical unevenness can be obtained. C[590] of the norbornene-based resin is preferably $1 \times 10^{-12}$ to $20 \times 10^{-12}$, and more preferably $1 \times 10^{-12}$ to $10 \times 10^{-12}$. In the specification of the present invention, the term "norbornene-based resin" refers to a (co) polymer obtained by using a norbornene-based monomer having a norbornene ring for a partial or entire starting material (monomer). The "(co) polymer" represents a homopolymer or a copolymer.

In the norbornene-based resin, a norbornene-based monomer having a norbornene ring (having a double-bond in a norbornane ring) is used as a starting material. The norbornene-based resin may or may not have a norbornene ring in a constituent unit in the state of a (co)polymer. In the state of the (co)polymer, examples of the norbornene-based resin having a norbornane ring in a constituent unit include tetracyclo[$4.4.1^{2,5}.1^{7,10}$.0]deca-3-ene, 8-methyltetracyclo[$4.4.1^{2,5}.1^{7,10}$.0]deca-3-ene, and 8-methoxycarbonyltetracyclo[$4.4.1^{2,5}.1^{7,10}$.0]deca-3-ene. The norbornene-based resin having no norbornane ring in a constituent unit in the state of a (co)polymer is a (co)polymer obtained, for example, by using a monomer to be a 5-membered ring by cleavage. Examples of the monomer to be a 5-membered ring by cleavage include norbornene, dicyclopentadiene, 5-phenylnorbornene, and a derivative thereof. In the case where the norbornene-based resin is a copolymer, the arrangement state of molecules is not particularly limited, and may be a random copolymer, a block copolymer, or a graft copolymer.

Examples of the above norbornene-based resin include (A) a resin obtained through hydrogenation of a ring-opened (co)polymer of a norbornene-based monomer, and (B) a resin obtained through addition (co)polymerization of a norbornene-based monomer. The ring-opened copolymer of a norbornene-based monomer includes a resin obtained through hydrogenation of a ring-opened copolymer of at least one norbornene-based monomer and α-olefins, cycloalkenes, and/or non-conjugate dienes. The above resin obtained through addition (co)polymerization) polymerization of a norbornene-based monomer includes a resin obtained through addition (co)polymerization of at least one norbornene-based monomer and α-olefins, cycloalkenes, and/or non-conjugate dienes.

The above resin obtained through hydrogenation of a ring-opened (co)polymer of a norbornene-based monomer can be obtained by subjecting a norbornene-based monomer or the like to a metathesis reaction to obtain a ring-opened (co) polymer, and further by hydrogenating the ring-opened (co) polymer. Specific examples include a method described in paragraphs [0059] to [0060] in JP 11-116780A, and a method described in paragraphs [0035] to [0037] of JP 2001-350017 A. The above resin obtained through addition (co)polymerization) polymerization of the norbornene-based monomer can be obtained by, for example, the method described in Example 1 of JP 61-292601 A.

As the weight average molecular weight (Mw) of the norbornene-based resin, a value measured by a gel permeation chromatography method (polystyrene standard) with a tetrahydrofuran solvent is preferably 20,000 to 500,000. The glass transition temperature (Tg) of the norbornene-based resin is preferably 120° C. to 170° C. With the above resin, a film having excellent heat stability and excellent stretchability can be obtained. The glass transition temperature (Tg) is a value calculated by a DSC method in accordance with JIS K 7121.

The retardation film containing the norbornene-based resin can be obtained by any suitable forming method. Preferably, the retardation film containing the norbornene-based resin is produced by stretching a polymer film which has been formed into a sheet by solvent casting or melt extrusion, by using a transverse uniaxial stretching method, a longitudinal and transverse simultaneous biaxial stretching method, or a longitudinal and transverse sequential biaxial stretching method. The temperature (stretching temperature) at which the polymer film is stretched is preferably 120° C. to 200° C. Further, the magnification (stretching ratio) at which the polymer film is stretched is preferably more than 1 to 3 times or less.

[Cellulose-based Resin]

As the cellulose-based resin, any appropriate resin can be adopted. The cellulose-based resin is preferably a cellulose organic acid ester or a cellulose-mixed organic acid ester in which a part or an entirety of a hydroxyl group of cellulose is replaced by an acetyl group, a propionyl group and/or a butyloyl group. Specific examples of the cellulose organic acid ester include cellulose acetate, cellulose propionate, and cellulose butyrate. Specific examples of the cellulose-mixed organic acid ester include cellulose acetate propionate and cellulose acetate butyrate. The cellulose-based resin is produced, for example, by a method described in paragraphs [0040] and [0041] of JP 2001-188128 A.

Regarding the weight average molecular weight (Mw) of the cellulose-based resin, a value measured by a gel permeation chromatograph (GPC) method with a tetrahydrofuran solvent is preferably 20,000 to 1,000,000, and more preferably 25,000 to 800,000. If the weight average molecular weight is in the above range, the retardation plate having excellent mechanical strength, and having satisfactory solubility, formability, and operability of flow-casting can be obtained. A glass transition temperature (Tg) of the cellulose-based resin is preferably 110° C. to 185° C. Tg of 110° C. or higher facilitates formation of a polymer film with favorable thermal stability, and Tg of 185° C. or lower has excellent forming processability. The glass transition temperature (Tg) can be determined by DSC method mentioned in accordance with JIS K 7121.

A retardation film containing the cellulose-based resin can be obtained any suitable forming method. Preferably, the retardation film containing the cellulose-based resin is produced by stretching a polymer film which has been formed into a sheet by solvent casting or melt extrusion, by using a transverse uniaxial stretching method, a longitudinal and transverse simultaneous biaxial stretching method, or a longitudinal and transverse sequential biaxial stretching method. The temperature (stretching temperature) at which the polymer film is stretched is preferably 120° C. to 200° C. Further, the magnification (stretching ratio) at which the polymer film is stretched is preferably more than 1 to 3 times or less.

The retardation film can further contain any suitable additive. Examples of the additive include a plasticizer, a heat stabilizer, a light stabilizer, a lubricant, an antioxidant, a UV absorber, a flame retardant, a colorant, an antistatic agent, a compatibilizing agent, a cross-linking agent, and a tackifier. The content of the additive is preferably more than 0 to 10 parts by weight or less with respect to 100 parts by weight of the each of the above mentioned resin.

<E. Adhesion Layer>

In a preferred embodiment, the polarizing plates (first polarizing plate, second polarizing plate and third polarizing plate) are each attached to other constituent member of a liquid crystal panel via an adhesion layer. As a material for forming the adhesion layer, any suitable adhesive and/or anchor coat agent can be selected in accordance with the kind and application of an adherend. Specific examples of the adhesive include a solvent-type adhesive, an emulsion-type adhesive, a pressure-sensitive adhesive, a remoistening adhesive, a condensation polymerization adhesive, a non-solvent-type adhesive, a film-shaped adhesive, and a hot-melt type adhesive, according to the classification based on the form. Specific examples of the adhesive include a synthetic resin adhesive, a rubber-based adhesive, and a natural adhesive, according to the classification based on a chemical structure. The adhesive includes a viscoelastic material (which may also be referred to as a pressure-sensitive adhesive) exhibiting the adhesive strength that can be detectable by the contact under pressure at room temperature.

Preferably, a material for forming the adhesion layer is a pressure-sensitive adhesive (which may also be referred to as an acrylic pressure-sensitive adhesive) in which an acrylic polymer is a base polymer. This is because such a material has excellent transparency, adhesiveness, weather resistance, and heat resistance. The thickness of the acrylic pressure-sensitive layer is generally 5 μm to 50 μm though it can be adjusted appropriately in accordance with the material and application of an adherend.

<F. Liquid Crystal Display Apparatus>

Figure 4:
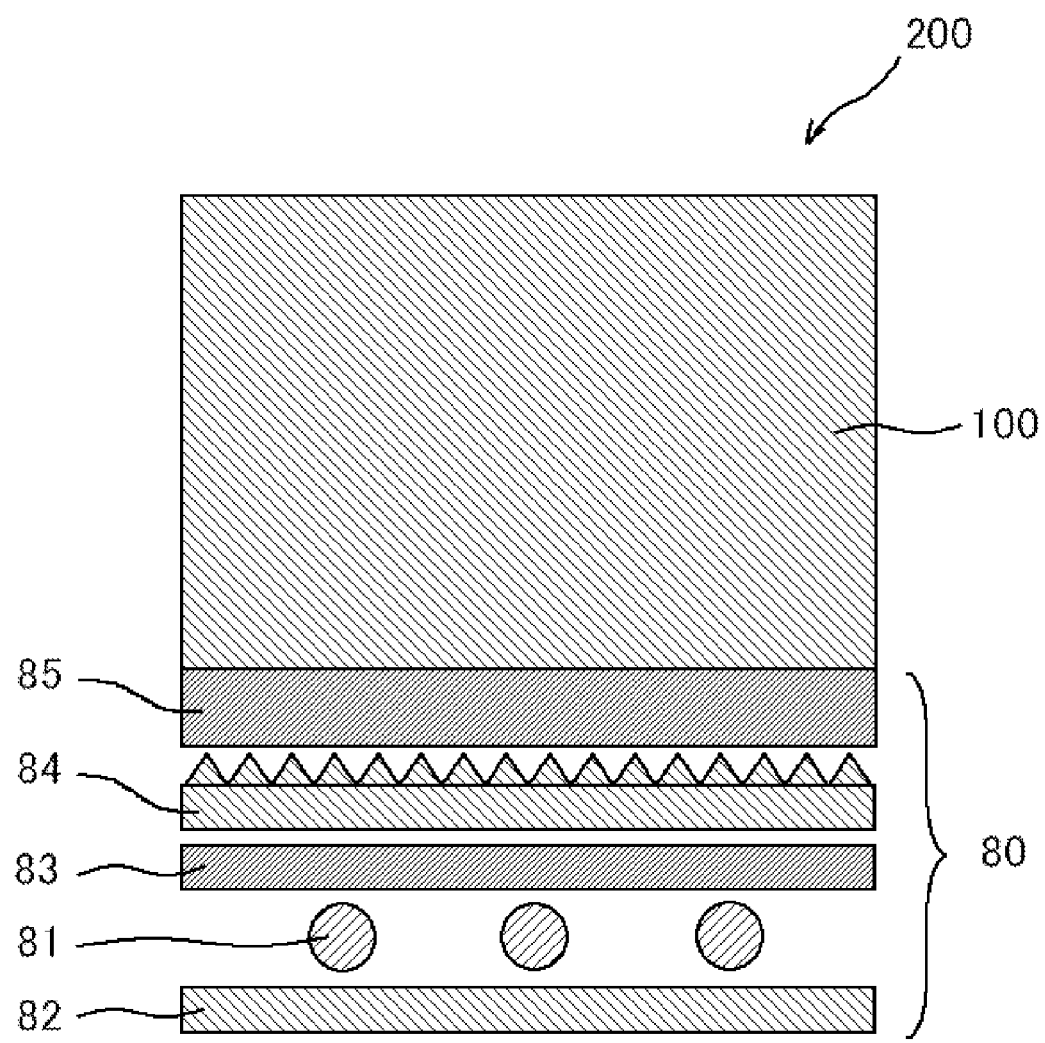
FIG. 4 is a schematic cross-sectional view of a liquid crystal display apparatus according to a preferred embodiment of the present invention.

The liquid crystal display apparatus of the present invention includes the above liquid crystal panel. FIG. 4 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 4 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes a light guide plate and a light reflector. As long as the effects of the present invention are obtained, a part of the optical member illustrated in FIG. 4 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type. Preferably, the liquid crystal display apparatus is a transmissive type.

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

The present invention will be described in more detail by using the following examples and comparative examples. However, the present invention is not limited to the examples. Analytical methods used in the examples are described below.

(1) Light Transmittance of Polarizing Plate:

A light transmittance (T) is a Y-value obtained through a visibility correction by a two-degree field of view (C light source) in accordance with JIS Z 8701-1982.

(2) Method of Measuring Content of Each Element (I, K)

The content of each element was obtained from an X-ray intensity obtained by measuring a circular sample with a diameter of 10 mm by fluorescent X-ray analysis under the following conditions, with a calibration curve previously created using a standard sample.

Analyzer: fluorescent X-ray analyzer (XRF) "ZSX100e" (trade name), manufactured by Rigaku Corporation
Anti-cathode: rhodium
Analyzing crystal: lithium fluoride
Excitation light energy: 40 kV-90 mA
Iodine measurement line: I-LA
Potassium measurement line: K-KA
Quantifying method: FP method
2θ angle peak: 103.078 deg (iodine), 136.847 deg (potassium)
Measurement time: 40 seconds (3) Method of Determining Retardation Values (Re[λ] and Rth[λ]), Nz Coefficient, and T[590]

The retardation values were determined by using "KOBRA21-ADH" (trade name, manufactured by Oji Scientific Instruments) at 23° C. The average refractive index was determined by measuring refractive indices by using an Abbe refractometer "DR-M4" (trade name, manufactured by Atago Co., Ltd.).

(4) Method of Measuring Thickness

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C type" (trade name, manufactured by Anritsu Corporation).

(5) Method of Measuring Contrast Ratio in Front Direction of Liquid Crystal Display Apparatus A backlight was lit in a dark room at 23° C. for 30 minutes, and thereafter, a lens was placed at a position of 50 cm above a panel, using "BM-5" (trade name, manufactured by Topcon Corporation). Then, a white image and a black image were displayed. A Y-value in an XYZ display system at this time was measured. A contrast ratio "YW/YB" in a front direction was calculated from a Y-value (YW: white brightness) in the white image and a Y-value (YB: brightness in a black display) in the black image.

<Production of a First, Second, and Third Polarizing Plates>

REFERENCE EXAMPLE 1

A polymer film ("VF-PS#7500" (trade name) manufacture by Kuraray Co., Ltd.) with a thickness of 75 μm containing a polyvinyl alcohol-based resin as a main component was soaked in 5 baths under the following conditions [1] to [5] while the tension was being applied to the film in a film longitudinal direction, and stretched so that the final stretching ratio became 6.2 times with respect to the film original length. The stretched film was dried in an air-circulating drying oven at 40° C. for one minute, whereby a polarizer A was produced. A polymer film ("TD80UF" (trade name); Re[590]=0 nm, Rth[590]=60 nm, manufactured by Fujifilm Corporation) with a thickness of 80 μm containing a cellulose-based resin was attached to both sides of the polarizer A via a water-soluble adhesive (GOHSEFIMER Z-200 (trade name) manufactured by Nippon Synthetic Chemical Industry Co., Ltd) containing a polyvinyl alcohol-based resin as a main component, whereby a polarizing plate A was produced. The properties of the polarizing plate A are shown in the following Table 1.

<Conditions>

[1] Swelling bath: pure water at 30° C.

[2] Coloring bath: aqueous solution at 30° C. containing 0.033 parts by weight of iodine with respect to 100 parts by weight of water and 0.2 parts by weight of potassium iodide with respect to 100 parts by weight of water

[3] First cross-linking bath: aqueous solution at 40° C. containing 3% by weight of potassium iodide and 3% by weight of boric acid

[4] Second cross-linking bath: aqueous solution at 60° C. containing 5% by weight of potassium iodide and 4% by weight of boric acid

[5] Washing bath: aqueous solution at 25° C. containing 3% by weight of potassium iodide

REFERENCE EXAMPLE 2

A polarizing plate B was produced by the same conditions and method as those in Reference Example 1, except that the adding amount of iodine in Condition [2] was 0.032 parts by weight with respect to 100 parts by weight of water. The properties of the polarizing plate B are shown in the following Table 1.

REFERENCE EXAMPLE 3

A polarizing plate C was produced by the same conditions and method as those in Reference Example 1, except that the adding amount of iodine in Condition [2] was 0.031 parts by weight with respect to 100 parts by weight of water. The properties of the polarizing plate C are shown in the following Table 1.

REFERENCE EXAMPLE 4

A polarizing plate D was produced by the same conditions and method as those in Reference Example 1, except that the adding amount of iodine in Condition [2] was 0.030 parts by weight with respect to 100 parts by weight of water. The properties of the polarizing plate D are shown in the following Table 1.

REFERENCE EXAMPLE 5

A polarizing plate E was produced by the same conditions and method as those in Reference Example 1, except that the adding amount of iodine in Condition [2] was 0.029 parts by weight with respect to 100 parts by weight of water. The properties of the polarizing plate E are shown in the following Table 1.

REFERENCE EXAMPLE 6

A polarizing plate F was produced by the same conditions and method as those in Reference Example 1, except that the adding amount of iodine in Condition [2] was 0.028 parts by weight with respect to 100 parts by weight of water. The properties of the polarizing plate F are shown in the following Table 1.

REFERENCE EXAMPLE 7

A polarizing plate G was produced by the same conditions and method as those in Reference Example 1, except that the adding amount of iodine in Condition [2] was 0.027 parts by weight with respect to 100 parts by weight of water. The properties of the polarizing plate G are shown in the following Table 1.

TABLE 1

|  | Polarizer A | Polarizer B | Polarizer C | Polarizer D | Polarizer E | Polarizer F | Polarizer G |
|---|---|---|---|---|---|---|---|
| Thickness (μm) | 30 | 30 | 30 | 30 | 30 | 30 | 30 |
| Light transmittance (%) | 40.9 | 41.4 | 42.4 | 42.7 | 44.5 | 47.7 | 51.7 |
| Polarization degree (%) | 99.99 | 99.99 | 99.99 | 99.99 | 99.99 | 99.10 | 77.23 |
| Iodine content (wt %) | 3.28732 | 3.07472 | 2.64952 | 2.52196 | 1.73453 | 1.23543 | 0.89765 |
| Potassium content (wt %) | 0.63498 | 0.62508 | 0.60528 | 0.59934 | 0.56374 | 0.50034 | 0.42114 |
| Boron content (wt %) | 2 | 2 | 2 | 2 | 2 | 2 | 2 |

<Production of First Retardation Plate and Second Retardation Plate>

REFERENCE EXAMPLE 8

A polymer film ("ZEONOR ZF14-100" (trade name) manufactured by OPTES Inc.) containing a norbornene-based resin having a thickness of 100 μm was stretched by a biaxial stretching method, using a tenter stretching machine, in an air-circulating thermostatic oven at 150° C. to produce a retardation plate. The retardation plate had a refractive index ellipsoid having a relationship of nx>ny>nz, a thickness of 45 μm, T[590] of 91%, Re[590] of 45 nm, Rth[590] of 157 nm, and a Nz coefficient of 3.5.

<Preparation of Liquid Crystal Cell>

REFERENCE EXAMPLE 9

A liquid crystal panel was taken out from a commercially available liquid crystal display apparatus [32-inch liquid crystal TV "BRAVIA KDL-32V2500" (trade name) manufactured by Sony Corporation] including a VA-mode liquid crystal cell, and all the optical films such as polarizing plates placed on upper and lower sides of the liquid crystal cell were removed. The front and reverse surfaces of a glass plate of the liquid crystal cell were washed to obtain a liquid crystal cell.

<Production of Liquid Crystal Panel and Liquid Crystal Display Apparatus>

EXAMPLE 1

The retardation plate produced in Reference Example 8 was attached, as a first retardation plate, to the viewer side of the liquid crystal cell produced in Reference Example 9 via an acrylic pressure-sensitive adhesive (thickness: 20 μm) so that the slow axis of the first retardation plate was substantially perpendicular to the long side direction of the liquid crystal cell. Then, the polarizing plate A produced in Reference Example 1 was attached, as a first polarizing plate, via an acrylic pressure-sensitive adhesive (thickness: 20 μm) so that the absorption axis direction of the polarizing plate A was substantially parallel to the long side direction of the liquid crystal cell. Then, the retardation plate produced in Reference Example 8 was attached, as a second retardation plate, to a side (backlight side) opposite to the viewer side of the liquid crystal cell via an acrylic pressure-sensitive adhesive (thickness: 20 μm) so that the slow axis direction of the second retardation plate was substantially parallel to the long side direction of the liquid crystal cell. Then, the polarizing plate D produced in Reference Example 4 was attached, as a second polarizing plate, to the surface on the backlight side of the second retardation plate via an acrylic pressure-sensitive adhesive (thickness: 20 μm) so that the absorption axis direction of the polarizing plate D was substantially perpendicular to the long side direction of the liquid crystal cell. At that time, the absorption axis direction of the first polarizing plate and the absorption axis direction of the second polarizing plate are substantially perpendicular to each other. Further, the slow axis direction of the first retardation plate is substantially perpendicular to the absorption axis of the first polarizing plate, and the slow axis direction of the second retardation plate is substantially perpendicular to the absorption axis direction of the second polarizing plate. Further, the polarizing plate D produced in Reference Example 4, as a third polarizing plate, was attached via an acrylic pressure-sensitive adhesive (thickness: 20 μm) so that the absorption axis direction of the polarizing plate D was substantially parallel to the absorption axis direction of the second polarizing plate. The liquid crystal panel thus obtained was combined with a backlight unit of the original liquid crystal display apparatus to produce a liquid crystal display apparatus. The properties of the obtained liquid crystal display apparatus are shown in the following Table 2.

EXAMPLES 2 to 13

Liquid crystal panels and liquid crystal display apparatuses were produced by the same method as that in Example 1, except for using the polarizing plates shown in Table 2 as the first and third polarizing plates. The properties of the obtained liquid crystal display apparatuses are shown in the following Table 2.

TABLE 2

| | First polarizing plate | | Second polarizing plate | | Third polarizing plate | | $\Delta T_{2-1}$ | $\Delta T_{3-1}$ | |
|---|---|---|---|---|---|---|---|---|---|
| | Polarizer | $T_1$ (%) | Polarizer | $T_2$ (%) | Polarizer | $T_3$ (%) | ($T_2 - T_1$ (%)) | ($T_3 - T_1$ (%)) | Contrast |
| Example 1 | A | 40.9 | D | 42.7 | D | 42.7 | 1.8 | 1.8 | 2,030 |
| Example 2 | B | 41.4 | D | 42.7 | D | 42.7 | 1.3 | 1.3 | 1,980 |
| Example 3 | C | 42.4 | D | 42.7 | D | 42.7 | 0.3 | 0.3 | 1,922 |
| Example 4 | A | 40.9 | D | 42.7 | E | 44.5 | 1.8 | 3.6 | 2,100 |
| Example 5 | B | 41.4 | D | 42.7 | E | 44.5 | 1.3 | 3.1 | 2,012 |

TABLE 2-continued

| | First polarizing plate | | Second polarizing plate | | Third polarizing plate | | $\Delta T_{2-1}$ | $\Delta T_{3-1}$ | |
|---|---|---|---|---|---|---|---|---|---|
| | Polarizer | $T_1$ (%) | Polarizer | $T_2$ (%) | Polarizer | $T_3$ (%) | ($T_2 - T_1$ (%)) | ($T_3 - T_1$ (%)) | Contrast |
| Example 6 | C | 42.4 | D | 42.7 | E | 44.5 | 0.3 | 2.1 | 1,951 |
| Example 7 | A | 40.9 | D | 42.7 | F | 47.7 | 1.8 | 6.8 | 2,024 |
| Example 8 | B | 41.4 | D | 42.7 | F | 47.7 | 1.3 | 6.3 | 2,052 |
| Example 9 | C | 42.4 | D | 42.7 | F | 47.7 | 0.3 | 5.3 | 1,975 |
| Example 10 | A | 40.9 | D | 42.7 | G | 51.7 | 1.8 | 10.8 | 1,990 |
| Example 11 | B | 41.4 | D | 42.7 | G | 51.7 | 1.3 | 10.3 | 1,955 |
| Example 12 | C | 42.4 | D | 42.7 | G | 51.7 | 0.3 | 9.3 | 1,910 |
| Example 13 | A | 40.9 | D | 42.7 | A | 40.9 | 1.8 | 0 | 2,010 |

COMPARATIVE EXAMPLE 1

A liquid crystal panel and a liquid crystal display apparatus were produced by the same method as that in Example 1, except that the third polarizing plate was not used. The properties of the obtained liquid crystal display apparatus are shown in the following Table 3.

COMPARATIVE EXAMPLE 2

A liquid crystal panel and a liquid crystal display apparatus were produced by the same method as that in Example 2, except that the third polarizing plate was not used. The properties of the obtained liquid crystal display apparatus are shown in the following Table 3.

COMPARATIVE EXAMPLE 3

A liquid crystal panel and a liquid crystal display apparatus were produced by the same method as that in Example 3, except that the third polarizing plate was not used. The properties of the obtained liquid crystal display apparatus are shown in the following Table 3.

COMPARATIVE EXAMPLE 4

A liquid crystal panel and a liquid crystal display apparatus were produced by the same method as that in Example 1, except that the polarizing plate D produced in Reference Example 4 was used as the first polarizing plate and the third polarizing plate was not used. The properties of the obtained liquid crystal display apparatus are shown in the following Table 3.

COMPARATIVE EXAMPLES 5 to 12

Liquid crystal panels and liquid crystal display apparatuses were produced by the same method as that in Example 1, except that polarizing plates shown in Table 3 were used as the first, the second, and the third polarizing plates. The properties of the obtained liquid crystal display apparatuses are shown in the following Table 3.

TABLE 3

| | First polarizing plate | | Second polarizing plate | | Third polarizing plate | | $\Delta T_{2-1}$ | $\Delta T_{3-1}$ | |
|---|---|---|---|---|---|---|---|---|---|
| | Polarizer | $T_1$ (%) | Polarizer | $T_2$ (%) | Polarizer | $T_3$ (%) | ($T_2 - T_1$ (%)) | ($T_3 - T_1$ (%)) | Contrast |
| Comparative Example 1 | A | 40.9 | D | 42.7 | — | — | 1.8 | — | 1,830 |
| Comparative Example 2 | B | 41.4 | D | 42.7 | — | — | 1.3 | — | 1,820 |
| Comparative Example 3 | C | 42.4 | D | 42.7 | — | — | 0.3 | — | 1,800 |
| Comparative Example 4 | D | 42.7 | D | 42.7 | — | — | 0 | — | 1,725 |
| Comparative Example 5 | D | 42.7 | D | 42.7 | A | 40.9 | 0 | −1.8 | 1,700 |
| Comparative Example 6 | D | 42.7 | D | 42.7 | D | 42.7 | 0 | 0 | 1,710 |
| Comparative Example 7 | D | 42.7 | A | 40.9 | A | 40.9 | −1.8 | −1.8 | 1,635 |
| Comparative Example 8 | D | 42.7 | A | 40.9 | C | 42.4 | −1.8 | −0.3 | 1,695 |
| Comparative Example 9 | C | 42.4 | A | 40.9 | D | 42.7 | −1.5 | 0.3 | 1,752 |
| Comparative Example 10 | D | 42.7 | C | 42.4 | A | 40.9 | −0.3 | −1.8 | 1,740 |
| Comparative Example 11 | B | 41.4 | C | 42.4 | A | 40.9 | 1.0 | −0.5 | 1,815 |
| Comparative Example 12 | C | 42.4 | D | 42.7 | A | 40.9 | 0.3 | −1.5 | 1,780 |

[Evaluation]

As shown in Examples 1 to 13, the liquid crystal display apparatus including a liquid crystal panel of the present invention exhibited a remarkably high contrast ratio in a front direction compared with that of a liquid crystal display apparatus including a conventional liquid crystal panel by having the first and second retardation plates and using the first, second, and third polarizing plates with a light transmittance adjusted.

As described above, the liquid crystal panel of the present invention exhibits a high contrast ratio in a front direction when used in a liquid crystal display apparatus. Therefore, the liquid crystal panel of the present invention is very useful for enhancing the display properties of a liquid crystal TV, a personal computer monitor, and a cellular phone.

What is claimed is:

1. A liquid crystal panel, comprising:
a liquid crystal cell comprising liquid crystal molecules aligned homeotropically;
a first polarizing plate placed on one side of the liquid crystal cell;
a second polarizing plate and a third polarizing plate placed on another side of the liquid crystal cell in the stated order from a side of liquid crystal cell;
a first retardation plate placed between the liquid crystal cell and the first polarizing plate; and
a second retardation plate placed between the liquid crystal cell and the second polarizing plate,
wherein:
refractive index ellipsoids of the first retardation plate and the second retardation plate exhibit a relationship of nx>ny>nz;
a light transmittance ($T_2$) of the second polarizing plate is larger than a light transmittance ($T_1$) of the first polarizing plate, and a light transmittance ($T_3$) of the third polarizing plate is equal to or larger than the light transmittance ($T_1$) of the first polarizing plate;
the second polarizing plate comprises a second polarizer;
the third polarizing plate comprises a third polarizer;
the third polarizer is a transmissive polarizer;
the absorption axis of the second polarizer and an absorption axis of the transmissive polarizer of the third polarizing plate are substantially parallel to each other; and
the light transmittance ($T_2$) of the second polarizing plate is not equal to the light transmittance ($T_3$) of the third polarizing plate.

2. A liquid crystal panel according to claim 1, wherein the light transmittance ($T_1$) of the first polarizing plate is 39.0 to 44.0%, and the light transmittance ($T_2$) of the second polarizing plate is 40.0 to 45.0%.

3. A liquid crystal panel according to claim 1, wherein the light transmittance ($T_3$) of the third polarizing plate is 40.0 to 60.0%.

4. A liquid crystal panel according to claim 1, wherein a difference ($\Delta T_{2-1}=T_2-T_1$) between the light transmittance ($T_2$) of the second polarizing plate and the light transmittance ($T_1$) of the first polarizing plate is 0.1 to 5.0%.

5. A liquid crystal panel according to claim 1, wherein a difference ($\Delta T_{3-1}=T_3-T_1$) between the light transmittance ($T_3$) of the third polarizing plate and the light transmittance ($T_1$) of the first polarizing plate is 0 to 19.0%.

6. A liquid crystal panel according to claim 1, wherein the first polarizing plate is placed on a viewer side of the liquid crystal cell, and the second polarizing plate and the third polarizing plate are placed on a side opposite to the viewer side of the liquid crystal cell.

7. A liquid crystal panel according to claim 1, wherein a slow axis of the first retardation plate and an absorption axis of a polarizer of the first polarizing plate are substantially perpendicular to each other, and a slow axis of the second retardation plate and an absorption axis of the second polarizer are substantially perpendicular to each other.

8. A liquid crystal panel according to claim 1, wherein each of thickness direction retardation (Rth[590]) at a wavelength of 590 nm of the first retardation plate and the second retardation plate is 80 to 400 nm.

9. A liquid crystal panel according to claim 1, wherein each of Nz coefficient of the first retardation plate and the second retardation plate is more than 1.1 and 8 or less.

10. A liquid crystal panel according to claim 1, wherein each of the first and second retardation plates is a retardation plate containing a polyimide-based resin, a polyamide-based resin, a polyester-based resin, a polyvinylacetal-based resin, a polycarbonate-based resin, an acrylic resin, a norbornene-based resin, or a cellulose-based resin.

11. A liquid crystal display apparatus, comprising the liquid crystal panel according to claim 1.

12. A liquid crystal panel, comprising:
a liquid crystal cell comprising liquid crystal molecules aligned homeotropically;
a first polarizing plate placed on one side of the liquid crystal cell;
a second polarizing plate and a third polarizing plate placed on another side of the liquid crystal cell in the stated order from a side of liquid crystal cell;
a first retardation plate placed between the liquid crystal cell and the first polarizing plate; and
a second retardation plate placed between the liquid crystal cell and the second polarizing plate,
wherein:
refractive index ellipsoids of the first retardation plate and the second retardation plate exhibit a relationship of nx>ny>nz;
a light transmittance ($T_2$) of the second polarizing plate is larger than a light transmittance ($T_1$) of the first polarizing plate, and a light transmittance ($T_3$) of the third polarizing plate is equal to or larger than the light transmittance ($T_1$) of the first polarizing plate;
each of Nz coefficient of the first retardation plate and the second retardation plate is more than 1.1 and 8 or less; and
wherein the light transmittance ($T_2$) of the second polarizing plate is not equal to the light transmittance ($T_3$) of the third polarizing plate.

13. A liquid crystal panel according to claim 12, wherein the light transmittance ($T_1$) of the first polarizing plate is 39.0 to 44.0%, and the light transmittance ($T_2$) of the second polarizing plate is 40.0 to 45.0%.

14. A liquid crystal panel according to claim 12, wherein the light transmittance ($T_3$) of the third polarizing plate is 40.0 to 60.0%.

15. A liquid crystal panel according to claim 12, wherein a difference ($\Delta T_{2-1}=T_2-T_1$) between the light transmittance ($T_2$) of the second polarizing plate and the light transmittance ($T_1$) of the first polarizing plate is 0.1 to 5.0%.

16. A liquid crystal panel according to claim 12, wherein a difference ($\Delta T_{3-1}=T_3-T_1$) between the light transmittance ($T_3$) of the third polarizing plate and the light transmittance ($T_1$) of the first polarizing plate is 0 to 19.0%.

17. A liquid crystal panel according to claim 12, wherein the first polarizing plate is placed on a viewer side of the liquid crystal cell, and the second polarizing plate and the third polarizing plate are placed on a side opposite to the viewer side of the liquid crystal cell.

18. A liquid crystal panel according to claim 12, wherein the second polarizing plate comprises a second polarizer, the third polarizing plate comprises a third polarizer, and the third polarizer is a transmissive polarizer.

19. A liquid crystal panel according to claim 18, wherein a slow axis of the first retardation plate and an absorption axis of a polarizer of the first polarizing plate are substantially perpendicular to each other, and a slow axis of the second retardation plate and an absorption axis of the second polarizer are substantially perpendicular to each other.

20. A liquid crystal panel according to claim 12, wherein each of thickness direction retardation ($Rth[590]$) at a wavelength of 590 nm of the first retardation plate and the second retardation plate is 80 to 400 nm.

21. A liquid crystal panel according to claim 12, wherein each of the first and second retardation plates is a retardation plate containing a polyimide-based resin, a polyamide-based resin, a polyester-based resin, a polyvinylacetal-based resin, a polycarbonate-based resin, an acrylic resin, a norbornene-based resin, or a cellulose-based resin.

22. A liquid crystal display apparatus, comprising the liquid crystal panel according to claim 12.

* * * * *